(12) United States Patent
Sasaki

(10) Patent No.: US 7,093,348 B2
(45) Date of Patent: Aug. 22, 2006

(54) METHOD OF MANUFACTURING A THIN FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 152 days.

(21) Appl. No.: 10/663,903

(22) Filed: Sep. 17, 2003

(65) Prior Publication Data

US 2004/0060165 A1    Apr. 1, 2004

Related U.S. Application Data

(62) Division of application No. 09/708,628, filed on Nov. 9, 2000, now Pat. No. 6,657,815.

(30) Foreign Application Priority Data

Nov. 12, 1999    (JP)    ............... 11-323386

(51) Int. Cl.
*G11B 5/127* (2006.01)
*H04R 31/00* (2006.01)

(52) U.S. Cl. ............... 29/603.13; 29/603.07; 29/603.14; 29/605; 29/606; 360/126; 360/317; 427/127; 427/128

(58) Field of Classification Search ............ 29/603.11, 29/603.13–603.16, 603.18; 360/126, 317
See application file for complete search history.

(56) References Cited

U.S. PATENT DOCUMENTS

| | | | | |
|---|---|---|---|---|
| 4,921,508 A | * | 5/1990 | Nonaka | 29/603.15 |
| 5,438,747 A | | 8/1995 | Krounbi et al. | 29/603.16 |
| 5,600,519 A | | 2/1997 | Heim et al. | 360/126 |
| 5,805,391 A | * | 9/1998 | Chang et al. | 360/317 |
| 5,995,343 A | * | 11/1999 | Imamura | 360/126 |
| 6,163,436 A | | 12/2000 | Sasaki et al. | 360/126 |
| 6,373,657 B1 | | 4/2002 | Kamijima | 360/126 |

FOREIGN PATENT DOCUMENTS

| | | |
|---|---|---|
| JP | A-63-39110 | 2/1988 |
| JP | A-2-15407 | 1/1990 |
| JP | A-5-6514 | 1/1993 |
| JP | 05166132 A * | 7/1993 |
| JP | 7-262519 | 10/1995 |
| JP | 8-249614 | 9/1996 |
| JP | A-9-180127 | 7/1997 |
| JP | 11-213331 | 6/1998 |

OTHER PUBLICATIONS

"Fabrication of thin film inductive heads with top core separated structure"; Kawabe, T.; Fuyama, M.; Narishige, S.; Sugita, Y.; Magnetics, IEEE Transactions on vol. 27, Issue 6, Nov. 1991 pp. 4936-4938.*

* cited by examiner

*Primary Examiner*—Paul D. Kim
(74) *Attorney, Agent, or Firm*—Oliff & Berridge, PLC

(57) ABSTRACT

The object of the invention is to provide a thin film magnetic head and a method of manufacturing the same, which allow the magnetic pole width to be precisely controlled and a sufficient overwrite performance to be attained even in a case where the magnetic pole width is microfabricated. The coupling position where the intermediate portion and the tip of the top pole are coupled each other is located closer to the air bearing surface than the throat height 0 position (TH0 position) which is the reference point for determining the throat height TH. The tip of the top pole defines the write track width on a recording medium. At least the portion of the intermediate portion from the TH0 position to the rear edge portion of the tip has a width wider than that of the tip. The intermediate portion suppresses saturation of the magnetic flux before flowing into the tip of the top pole.

13 Claims, 32 Drawing Sheets

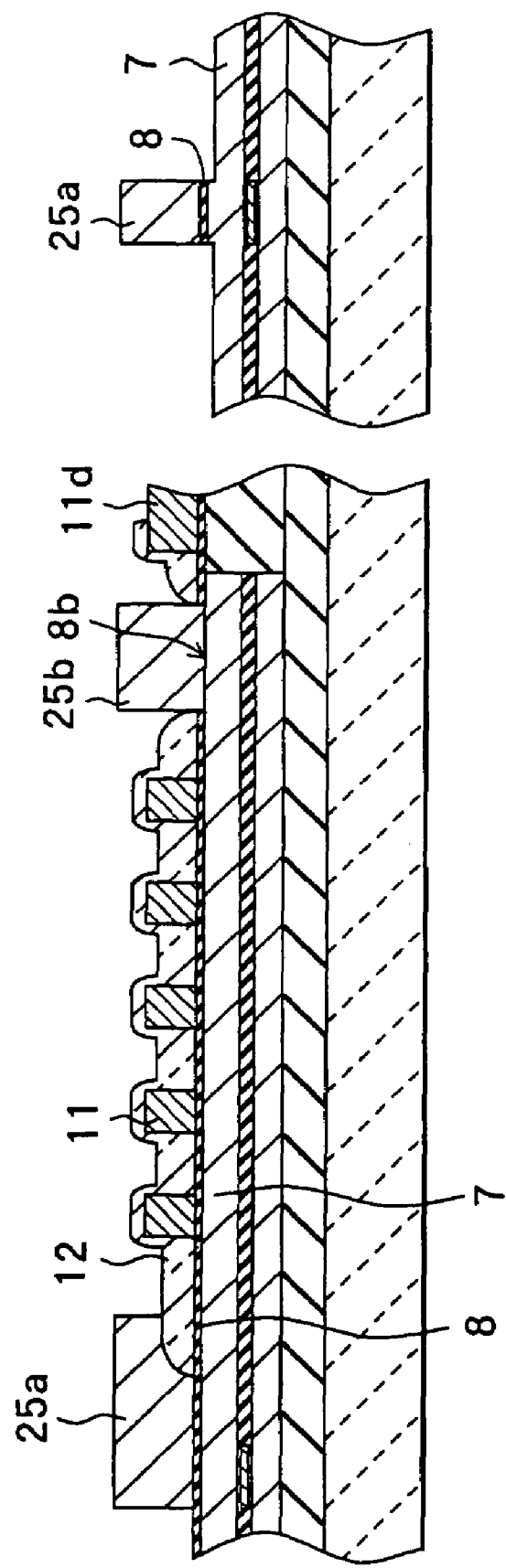

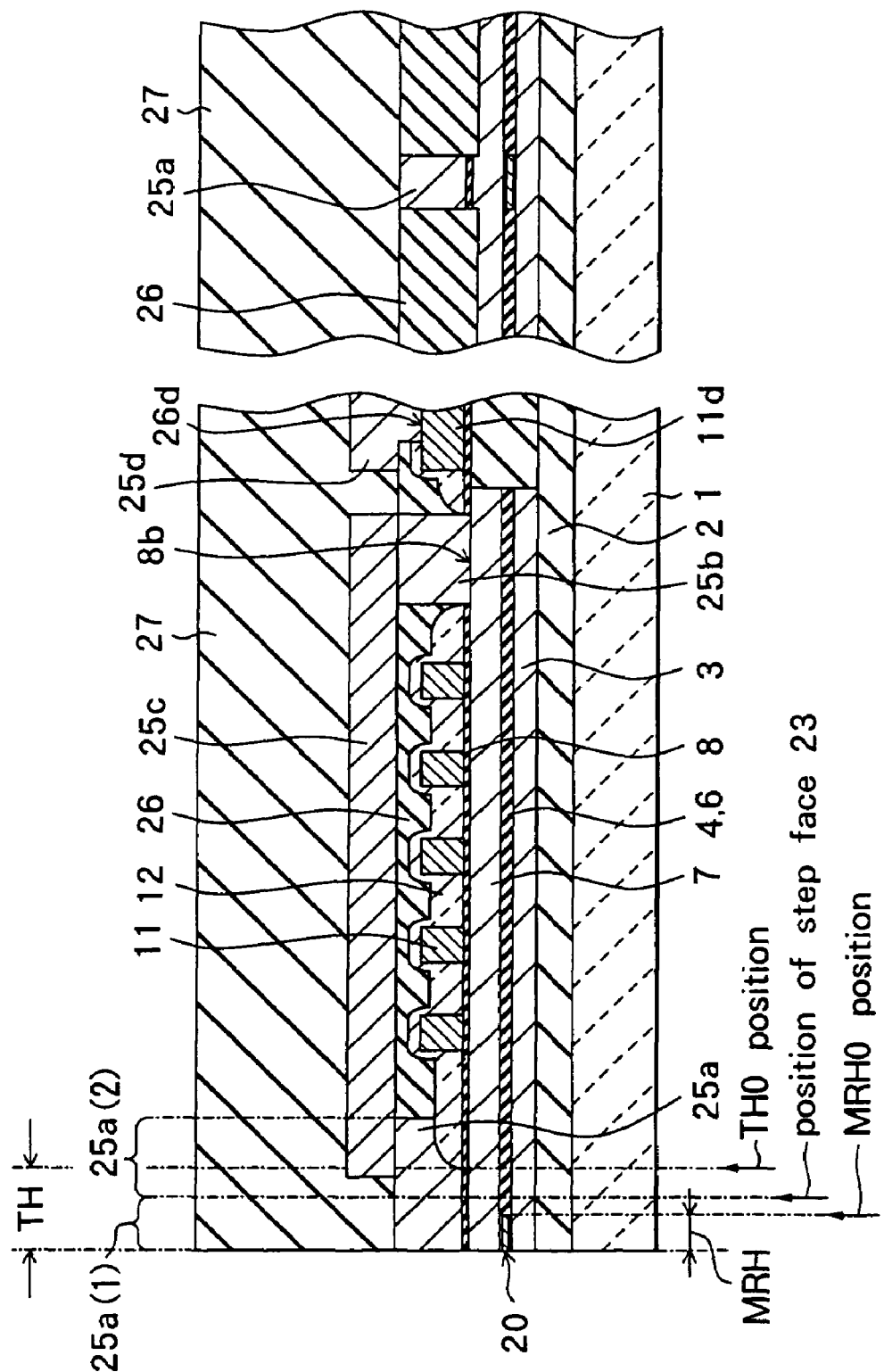

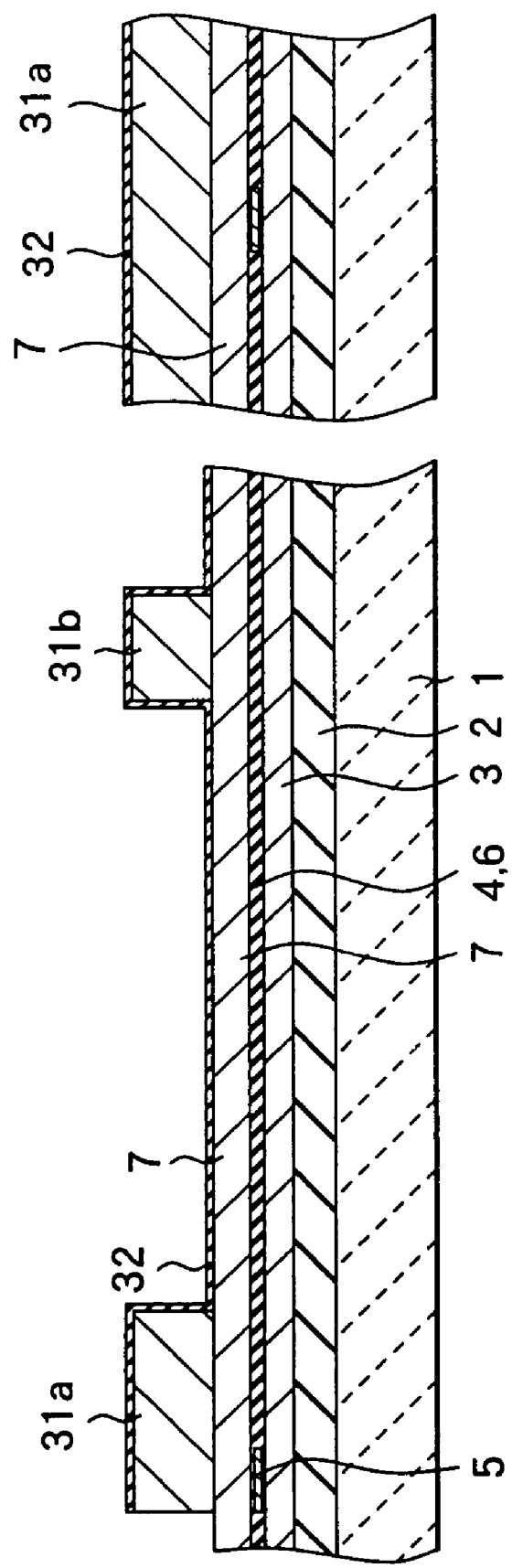

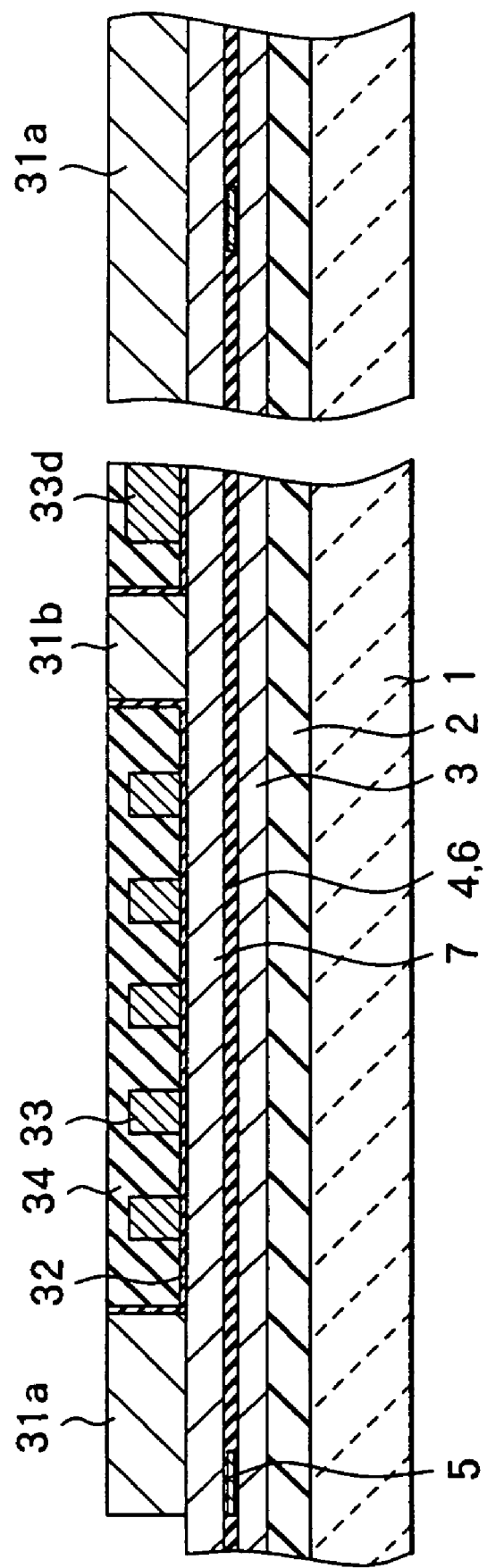

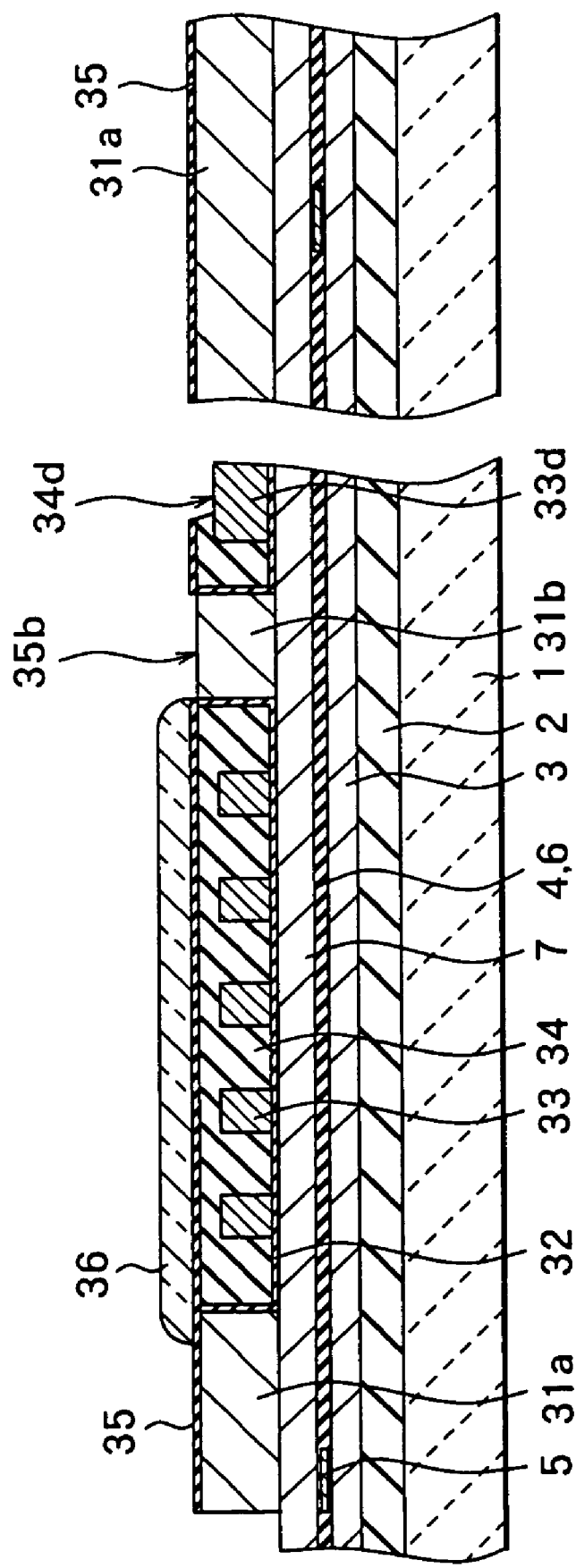

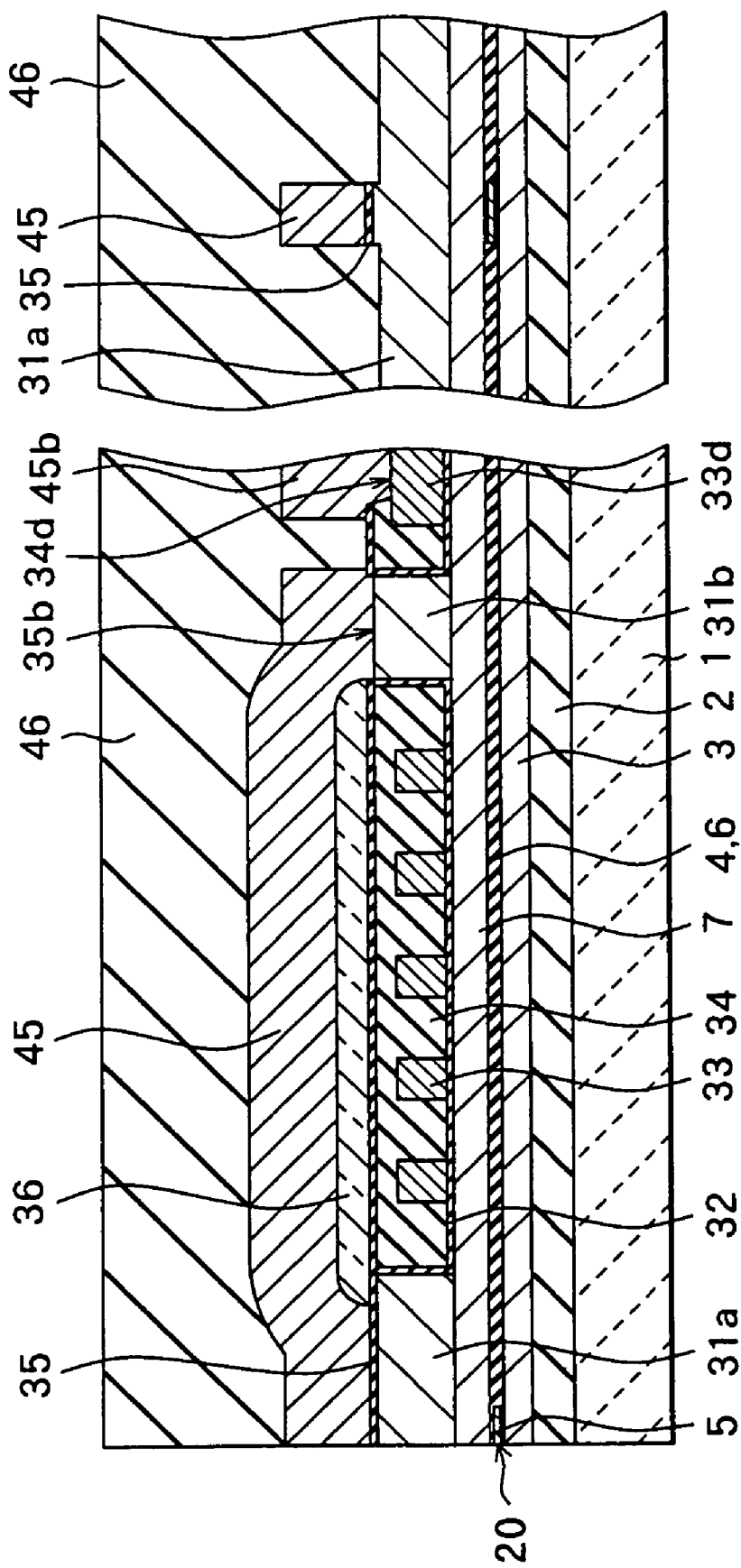

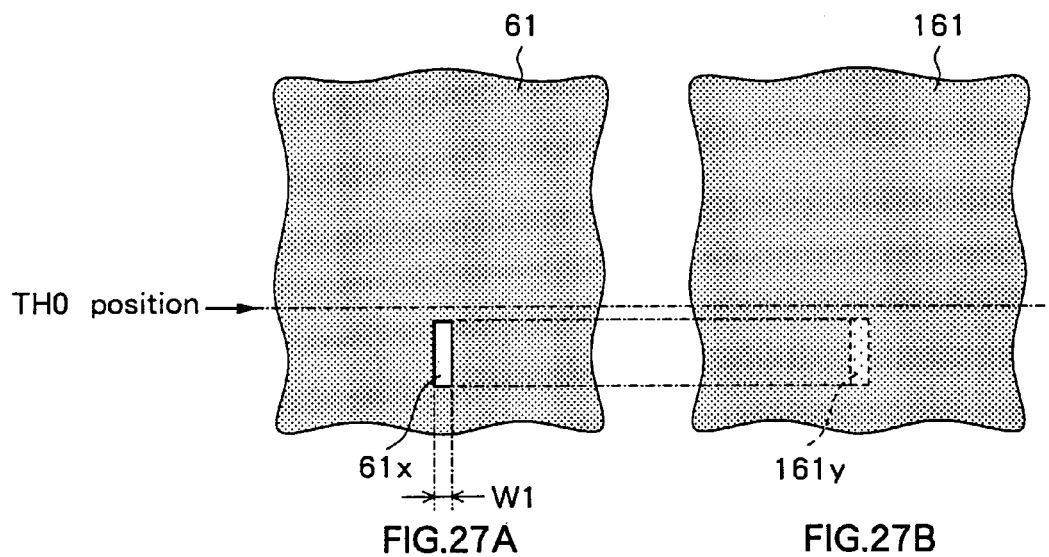
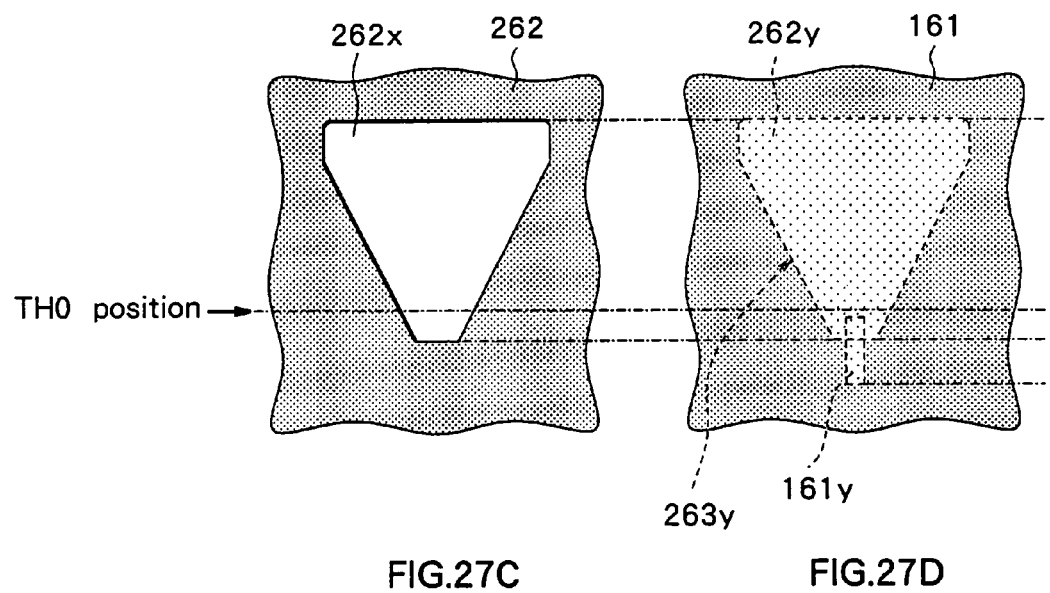

METHOD OF MANUFACTURING A THIN FILM MAGNETIC HEAD

This is a Divisional of U.S. application Ser. No. 09/708,628, filed on Nov. 9, 2000, now U.S. Pat. No. 6,657,815, the contents of which are incorporated herein in its entirety.

BACKGROUND OF THE INVENTION

1. Field of the Invention

The invention relates to a thin film magnetic head comprising at least an inductive magnetic transducer for writing and a method of manufacturing the same.

2. Description of the Related Art

In recent years, performance improvement in thin film magnetic heads has been sought in accordance with an increase in surface recording density of a hard disk drive. As a thin film magnetic head, a composite thin film magnetic head has been widely used. A composite thin film magnetic head has a layered structure which includes a recording head with an inductive magnetic transducer for writing and a reproducing head with a magnetoresistive device (referred to as MR device in the followings) for reading-out. There are a few types of MR devices: one is an AMR device that utilizes an anisotropic magnetoresistive effect (referred to as AMR effect in the followings) and the other is a GMR device that utilizes a giant magnetoresistive effect (referred to as GMR effect in the followings). A reproducing head using the AMR device is called an AMR head or simply an MR head. A reproducing head using the GMR device is called a GMR head. The AMR head is used as a reproducing head whose surface recording density is more than 1 gigabit per square inch. The GMR head is used as a reproducing head whose surface recording density is more than 3 gigabits per square inch.

The AMR head includes an AMR film having the AMR effect. The GMR head has the similar configuration to the AMR head except that the AMR film is replaced with a GMR film having the GMR effect. However, compared to the AMR film, the GMR film exhibits a greater change in resistance under a specific external magnetic field. Accordingly, the reproducing output of the GMR head becomes about three to five times greater than that of the AMR head.

In order to improve the performance of a reproducing head, the MR film may be changed from an AMR film to a GMR film or the like which is made of a material with more excellent magnetoresistive sensitivity. The pattern width of the MR film, specifically the MR height, may be adjusted appropriate. The MR height is the length (height) between the edge of an MR element closer to an air bearing surface and the other edge, and is determined by an amount of polishing the air bearing surface. The air bearing surface (ABS) is a surface of a thin film magnetic head facing a magnetic recording medium and is also called a track surface.

Performance improvement in a recording head has also been expected in accordance with the performance improvement in a reproducing head. The main factor which determines the performance of a recording head is a throat height (TH). The throat height is a length (height) of a portion of a magnetic pole from the air bearing surface to an edge of an insulating layer which electrically isolates a thin film coil for generating a magnetic flux. It is necessary to reduce the throat height in order to improve the performance of the recording head. The throat height is also controlled by an amount of polishing the air bearing surface.

It is necessary to increase the track density of a magnetic recording medium in order to increase the recording density among the performance of a recording head. In order to achieve this, it is necessary to realize a recording head with a narrow track structure in which the width of a bottom pole and a top pole sandwiching a write gap on the air bearing surface is reduced to the order of some microns to submicron. Semiconductor processing technology is used to achieve the narrow track structure.

Now, an example of a method of manufacturing the composite thin film magnetic head will be described as an example of a method of manufacturing the thin film magnetic head of the related art with reference to FIG. 30 to FIG. 35.

In the manufacturing method, as shown in FIG. 30, an insulating layer 102 about 5 to 10 μm thick made of alumina (aluminum oxide, $Al_2O_3$), for example, is deposited on a substrate 101 made of altic ($Al_2O_3$ and TiC), for example. Then, a bottom shield layer 103 for a reproducing head is formed on the insulating layer 102. Next, for example, alumina about 100 to 200 nm thick is deposited on the bottom shield layer 103, whereby a shield gap film 104 is formed. Next, an MR film 105 of a few tens of nanometers in thickness for making up the MR element for reproducing is formed on the shield gap film 104, and is patterned to a desired shape by photolithography with high precision. Next, a lead layer (not shown in figure) as a lead electrode layer which is electrically connected to the MR film 105 is formed on both sides of the MR film 105. Then, a shield gap film 106 is formed on the lead layer, the shield gap film 104 and the MR film 105, and the MR film 105 is buried in the shield gap films 104 and 106. Next, a top shield-cum-bottom pole (referred to as a bottom pole in the followings) 107 made of permalloy (NiFe), for example, which is a magnetic material used for both the reproducing head and the recording head, is formed on the shield gap film 106.

Next, as shown in FIG. 31, a write gap layer 108 made of an insulating film such as an alumina film is formed on the bottom pole 107, and a photoresist film 109 is formed in a predetermined pattern on the write gap layer 108 by photolithography with high precision. Then, a first layer of a thin film coil 110 for an inductive recording head made of copper (Cu), for example, is formed on the photoresist film 109 by plating, for example. Next, a photoresist film 111 is formed in a predetermined pattern so as to cover the photoresist film 109 and the coil 110 by photolithography with high precision. A heat treatment at 250° C., for example, is applied in order to flatten the photoresist film 111 and to isolate between the turns of the coil 110. Then, a second layer of a thin film coil 112 made of copper, for example, is formed on the photoresist film 111 by plating, for example. Next, a photoresist film 113 is formed in a predetermined pattern on the photoresist film 111 and the coil 112 by photolithography with high precision, and a heat treatment at 250° C., for example, is applied in order to flatten the photoresist film 113 and to isolate between the turns of the coil 112.

Next, as shown in FIG. 32, an opening 108a for forming a magnetic path is formed in a rear position (right-hand side in FIG. 32) of the coils 110 and 112 by partially etching the write gap layer 108. Then, a top yoke-cum-top pole (referred to as a top pole in the followings) 114 made of a magnetic material for a recording head such as permalloy is selectively formed on the write gap layer 108, the photoresist films 109, 111 and 113. The top pole 114 is in contact with the bottom pole 107 in the above-mentioned opening 108a and is magnetically coupled to each other. Next, after etching the write gap layer 108 and the bottom pole 107 about 0.5 µm thick by ion milling using the top pole 114 as a mask, an overcoat layer 115 made of alumina, for example, is formed on the top pole 114. A thin film magnetic head is completed after performing machine processing on the slider to form a track surface of a recording head and a reproducing head, that is, an air bearing surface 120.

FIG. 33 to FIG. 35 show a completed structure of a thin film magnetic head. FIG. 33 shows a cross section of the thin film magnetic head vertical to the air bearing surface 120, while FIG. 34 shows an enlarged cross section of the magnetic pole portion parallel to the air bearing surface 120, and FIG. 35 shows a plan view. FIG. 32 corresponds to a cross-sectional view taken along the line XXX II—XXX II of FIG. 35. In FIG. 33 to FIG. 35, the overcoat layer 115 is omitted.

In order to improve the performance of a thin film magnetic head, it is important to precisely form the throat height TH, an apex angle θ, a pole width P2W and a pole length P2L shown in FIG. 33 and FIG. 34. The apex angle θ is an angle between a line connecting the corners of the side surfaces of the photoresist films 109, 111, 113 on the track surface side and the upper surface of the top pole 114. The pole width P2W determines a write track width of the recording medium. The pole length P2L represents the thickness of the magnetic pole. In FIG. 33 and FIG. 35, "TH0 position" is the position of the edge of the photoresist film 109 on the air bearing surface 120 side, which is an insulating layer for electrically isolating the thin film coils 110 and 112, and represents a reference position when the throat height TH is determined.

As shown in FIG. 34, a structure in which sidewalls of the top pole 114, the write gap layer 108 and part of the bottom pole 107 are vertically formed in a self-aligned manner is called a trim structure. With the trim structure, increase of an effective track width caused by a spread of the magnetic flux occurred while writing on the narrow track can be suppressed. As shown in FIG. 34, a lead layer 121 as a lead electrode layer, which is electrically connected to the MR film 105, is provided on both sides of the MR film 105. The lead layer 121 is omitted in FIG. 30 to FIG. 33.

FIG. 36 shows a plan structure of the top pole 114. As shown in FIG. 36, the top pole 114 comprises a yoke 114a, which makes up most of the top pole 114, and a pole tip 114b with almost a constant width W100 as the pole width P2W. In the connection between the yoke 114a and the pole tip 114b, the outer edge of the yoke 114a forms an angle α with the surface parallel to the air bearing surface 120, while the outer edge of the pole tip 114b forms an angle β with the surface parallel to the air bearing surface 120. α is about 45° degrees, for example, and β is 90° degrees. The width of the pole tip 114b determines the write track width of the recording medium. A portion F is the front side of the TH0 position (close to the air bearing surface 120) of the pole tip 114b and a portion R is the rear side of the TH0 position (close to the yoke 114a) of the pole tip 114b. As shown in FIG. 33, the portion F is extended on the flat write gap layer 108, and the portion R and the yoke 114a are extended on a coil portion (called as an apex portion in the followings) which is covered with the photoresist films 109, 111, and 113 and is protruded like a mountain.

The distinctive shape of the top pole is disclosed in Japanese Patent Application laid-open No. Hei 8-249614, for example.

It is necessary to precisely form the pole width P2W in order to determine the write track width of the recording head. Especially in recent years, in order to attain high surface recording density, that is, to form the recording head with a narrow track structure, microfabrication in which the pole width P2W of the top pole is formed equal to or less than 1.0 µm is required.

As a method of forming the top pole, for example, frame plating method is used as disclosed in Japanese Patent Application laid-open No. Hei 7-262519. When the top pole 114 is formed by the frame plating method, first, a thin electrode film made of permalloy, for example, is formed all over the apex area by sputtering, for example. Next, a photoresist film is formed thereon by applying photoresist, and the photoresist film is patterned in a desired shape through photolithography in order to form a photoresist pattern to be a frame for forming a top pole by plating. The top pole 114 is formed by plating with the electrode film formed earlier being a seed layer and the photoresist pattern being a mask.

There is, for example, 7 to 10 µm or more difference in height between the apex area and other areas. On the apex area, a photoresist of 3 to 4 µm thick is applied. If the film thickness of the photoresist formed on the apex area is required to be 3 µm or more, a photoresist film about 8 to 10 µm thick or more, for example, is formed in the lower part of the apex area since the photoresist with liquidity gathers into a lower area.

In order to form the narrow track as described, it is necessary to form a frame pattern with a width of about 1.0 µm using a photoresist film. That is, a micro pattern with a width of 1.0 µm or less is to be formed by the photoresist film of 8 to 10 µm or thicker. However, it is extremely difficult in a manufacturing process to form such a thick photoresist pattern with a narrow pattern width.

In addition, during an exposure of photolithography, a light for the exposure reflects by an undercoat electrode film as a seed layer and the photoresist film is exposed also by the reflecting light causing deformation of the photoresist pattern and the like. As a result, a photoresist pattern with a sharp and precise pattern shape can not be attained. Therefore, the side walls of the top pole take a round shape so that the top pole can not be formed in a desired shape. Especially, as shown in FIG. 37, it is further difficult to attain a desired width W100A by further microfabricating the pole width P2W. It is because the reflecting light reflected by the undercoat electrode film in the area R of the pole chip portion 114b extended on the apex area includes not only the reflecting light in a vertical direction but also the reflecting light from the slope of the apex area in an oblique direction or in a lateral direction influencing the exposure of the photoresist film. As a result, the pattern width of the photoresist pattern which determines the pole width P2W becomes greater than the anticipated value (as shown by the broken line) and it takes a shape as shown by a solid line in FIG. 37. The width of the portion F of the pole tip 114b which is front of TH0 position (air bearing surface 120 side) is an extremely important factor for determining the track width on the recording medium. Therefore, if the width of the portion F becomes greater than the above-mentioned value W100A, the targeted minute track width can not be attained.

Such problems also exist in the above-mentioned magnetic head disclosed in Japanese Patent laid-open No. Hei 8-249614. It is because, in this magnetic head, the width of the portion which is front of the TH0 position (air bearing surface 120 side) can not be precisely controlled because of the influence on the exposure of the photoresist film by a reflecting light from the apex area in an oblique direction and a lateral direction since the pole width moderately changes from the TH0 position towards the yoke.

As shown in FIG. 37, the portion R of the pole tip 114b, which extends from the TH0 position to the connection between the pole tip 114b and the yoke 114a, has about the same width as the portion F which extends from the TH0 position to the air bearing surface 120, and the portion R has a smaller cross-sectional area. As a result, the magnetic flux from the yoke 114a is saturated in the portion R and can not sufficiently reach the portion F which determines the track width. Therefore, the overwrite performance, that is, the characteristic of overwriting data on a recording medium on which data has already been written, is reduced to a degree about 10 to 20 dB, for example, so that a sufficient overwrite performance can not be attained.

SUMMARY OF THE INVENTION

The invention has been designed to overcome the foregoing problems. The object is to provide a thin film magnetic head in which precise control of the pole width can be performed and a sufficient overwrite performance can be attained even in a case where the pole width is microfabricated, and a method of manufacturing such a thin film magnetic head.

A thin film magnetic head comprises: two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers; wherein one of the two magnetic layers includes: a first magnetic layer portion extending from recording-medium-facing surface in a longitudinal direction to be away from the recording-medium-facing surface, and having a constant width for defining a write track width of a recording medium; and a second magnetic layer portion magnetically coupled to the first magnetic layer portion in the rear edge of the first magnetic layer portion on the side away from the recording-medium-facing surface; wherein a coupling position at which the first and second magnetic layer portions are coupled each other is closer to the recording-medium-facing surface than the front edge of the insulating layer on the side close to the recording-medium-facing-surface; and at least the portion of the second magnetic layer portion between the front edge of the insulating layer and the rear edge of the first magnetic layer portion has a width wider than that of the first magnetic layer portion.

A method of manufacturing a thin film magnetic head of first aspect of the invention is a method of manufacturing a thin film magnetic head including two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers; formation of one of the two magnetic layers is performed by the steps of: forming a first magnetic layer portion extending from recording-medium-facing surface in a longitudinal direction to be away from the recording-medium-facing surface, and having a constant width for defining a write track width of a recording medium; and forming a second magnetic layer portion magnetically coupled to the first magnetic layer portion in the rear edge of the first magnetic layer portion on the side away from the recording-medium-facing surface; wherein a coupling position at which the first and second magnetic layer portion are coupled each other is closer to the recording-medium-facing surface than a front edge of the insulating layer on the side close to the recording-medium-facing-surface; and at least the portion of the second magnetic layer portion between the front edge of the insulating layer and the rear edge of the first magnetic layer portion has a width wider than that of the first magnetic layer portion.

In the thin film magnetic head of the invention or the manufacturing method of a thin film magnetic head of the one aspect of the invention, the write track width of a recording medium is defined by the constant width of a first magnetic layer portion. The first magnetic layer portion is magnetically coupled to a second magnetic layer portion in the rear edge further from the recording medium. The coupling position between the first magnetic layer portion and the second magnetic layer portion is located on the side closer to the recording-medium facing surface than the front edge of the insulating layer which is close to the recording-medium facing surface, and at least the portion of the second magnetic layer portion between the front edge of the insulating layer and the rear edge of the first magnetic layer portion has a width wider than that of the first magnetic layer portion. Therefore, enough magnetic volume is maintained in this area.

In a thin film magnetic head of the invention or a manufacturing method of a thin film magnetic head of the one aspect of the invention, a step in a width direction may be formed at the coupling position of the first magnetic layer portion and the second magnetic layer portion. In such a case, a step face vertical to an extending direction of the first magnetic layer portion may be formed at the coupling position. Further in a case of a thin film magnetic head comprising a magnetic transducer film extending from the recording-medium-facing surface in a longitudinal direction to be away from the recording-medium-facing surface, preferably the coupling position may be located between the rear edge of the magnetic transducer film and the front edge of the insulating layer. In the case, the length from the recording-medium-facing surface to the front edge of the insulating layer may preferably lie within the range of one-and-a-half to six times the length of the magnetic transducer film.

In a thin film magnetic head of the invention or a manufacturing method of a thin film magnetic head of the one aspect of the invention, the one of the two magnetic layers may further include a third magnetic layer portion which is magnetically coupled to the second magnetic layer portion and extends to cover a part of the thin film coil with the insulating layer in between. In such a case, the first, second and third magnetic layer portions may be integrally formed in one piece through a series of the manufacturing steps. Otherwise, the first and second magnetic layer portions may be integrally formed in one piece through a series of the manufacturing steps and the third magnetic layer portion may be formed separately from the first and second magnetic layer portions through a manufacturing step different from the steps of manufacturing the first and second magnetic layer portions. In this case, the third magnetic layer may be preferably formed so that the third magnetic layer extends overlapping at least a part of the second magnetic layer portion.

In a thin film magnetic head of the invention or a manufacturing method of a thin film magnetic head of the one aspect of the invention, the gap layer may have a region with a flat surface, the thin film coil may be formed on the flat region of the gap layer; and the insulating layer may include an insulating film which covers the whole of the thin film coil and a part of the gap layer. In such a case, the position of the front edge of the insulating layer may be preferably defined by an edge of the insulating film on the side closer to the recording-medium-facing surface. Also, the first magnetic layer portion may be preferably located on a part of the region with a flat surface of the gap layer, the part of the region being not covered with the insulating film. In this case, the second magnetic layer portion may preferably extend from the coupling position onto the slope of the insulating film. In this case, the second magnetic layer portion may terminate on the slope of the insulating film; and the insulating layer may preferably include another insulating film formed to fill a space over the insulating film up to the same level as a top surface of the second magnetic layer portion.

In a thin film magnetic head of the invention or a manufacturing method of a thin film magnetic head of the one aspect of the invention, the other magnetic layer of the two magnetic layers may include a fourth magnetic layer portion with a flat surface, and a fifth magnetic layer portion located facing the first and second magnetic layer portions with the gap layer in between and magnetically coupled to the fourth magnetic layer portion; and the thin film coil may be buried between the fourth magnetic layer portion and the gap layer with a part of the insulating layer in between. In this case, the position of the front edge of the insulating layer may preferably be defined by the rear edge of the fifth magnetic layer portion, the rear edge being on the side closer to the recording-medium-facing surface. Also, when the gap layer may have a region with a flat surface; the insulating layer may include an insulating film formed on the opposite side of the thin film coil with the gap layer in between, the first magnetic layer portion may be located on a part of the region with a flat surface of the gap layer, the part of the region being not covered with the insulating film and the second magnetic layer portion may extend from the coupling position onto the slope of the insulating film.

A method of manufacturing a thin film magnetic head in another aspect of the invention is a method of manufacturing a thin film magnetic head including two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers; wherein one of the two magnetic layers includes: a first magnetic layer portion extending from recording-medium-facing surface in a longitudinal direction to be away from the recording-medium-facing surface, and having a constant width for defining a write track width of a recording medium; and a second magnetic layer portion magnetically coupled to the first magnetic layer portion in the rear edge of the first magnetic layer portion on the side away from the recording-medium-facing surface; the method comprising: a step of forming an insulating film on the gap layer with a flat surface, the insulating film having a slope towards the surface of the gap layer and constituting at least a part of the insulating layer; a step of forming a photoresist layer so as to cover the gap layer and the insulating film; a first exposure step of selectively exposing a first region of the photoresist layer including a region corresponding to the first magnetic layer portion, the first region corresponding to a flat region of the gap layer; and a second exposure step of selectively exposing at least a second region of the photoresist layer corresponding to the second magnetic layer portion, the second region corresponding to a region from the slope of the insulating film to the flat region of the gap layer: wherein the first region and the second region partially overlap each other.

In a method of manufacturing a thin film magnetic head of another aspect of the invention, after the insulating film, which constitutes at least a part of the insulating layer, is formed on the flat gap layer, a photoresist layer is formed so as to cover the gap layer and the insulating layer. Then, the first region of the photoresist layer in the flat region of the gap layer, the first region including a region corresponding to the first magnetic layer portion, is selectively exposed. Also, at least the second region of the photoresist layer from the slope of the insulating film to the flat region of the gap layer, the second region corresponding to the second magnetic layer portion, is selectively exposed so as to partially overlap the first region.

In a method of manufacturing a thin film magnetic head in another aspect of the invention, the second magnetic layer portion may preferably be formed so that: a coupling position at which the first magnetic layer portion and the second magnetic layer portion are coupled each other is closer to the recording-medium-facing surface than the front edge of the insulating layer on the side close to the recording-medium-facing-surface; and at least the portion of the second magnetic layer portion between the front edge of the insulating layer and the rear edge of the first magnetic layer portion has a width wider than that of the first magnetic layer portion.

A method of manufacturing a thin film magnetic head in another aspect of the invention, the first region may include:a constant-width part having a constant width, which extends from the recording-medium-facing surface in a longitudinal direction to be away from the recording-medium-facing surface and defines the write track width of the recording medium; and a wide-width part with a width wider than the constant-width part, at least a part of the wide-width part overlapping the second region. Also, the first region may have a substantially constant width at any point in a longitudinal direction.

In a method of manufacturing a thin film magnetic head in another aspect of the invention, the one of the magnetic layer further may include a third magnetic layer which is magnetically coupled to the second magnetic layer portion and extends to cover a part of the thin film coil with the insulating layer in between, and a third region of the photoresist layer corresponding to the third magnetic layer portion simultaneously may be exposed by the second exposure step. In such a case, preferably it may include a development step of forming a first photoresist pattern by developing the first and second regions which have been exposed, all together; and a step of integrally forming the first, second and third magnetic layer portion in one piece using the first photoresist pattern. Also, when the one of the two magnetic layers further includes a third magnetic layer portion which is magnetically coupled to the second magnetic layer portion and extends to cover a part of the thin film coil with the insulating layer in between; the method further preferably may include: a third exposure step of exposing a third region corresponding to the third magnetic layer; a development step of forming a third photoresist pattern by developing the third region exposed in the third exposure step; and a step of forming the third magnetic layer portion using the third photoresist pattern.

Other and further objects, features and advantages of the invention will appear more fully from the following description.

BRIEF DESCRIPTION OF THE DRAWINGS

FIGS. 15A and 15B show cross sections for describing a step following FIGS. 14A and 14B.

FIGS. 16A and 16B show cross sections for describing a step following FIGS. 15A and 15B.

FIGS. 23A and 23B show cross sections for describing a step in a method of manufacturing a thin film magnetic head according to a third embodiment of the invention.

FIGS. 24A and 24B are cross sections following FIGS. 23A and 23B.

FIGS. 25A and 25B are cross sections following FIGS. 24A and 24B.

FIGS. 26A and 26B are cross sections following FIGS. 25A and 25B.

FIGS. 27A to 27D show plan views for describing a manufacturing step of the top pole in a method of manufacturing a thin film magnetic head according to the third embodiment of the invention.

DETAILED DESCRIPTION OF THE PREFERRED EMBODIMENTS

Figure 1:
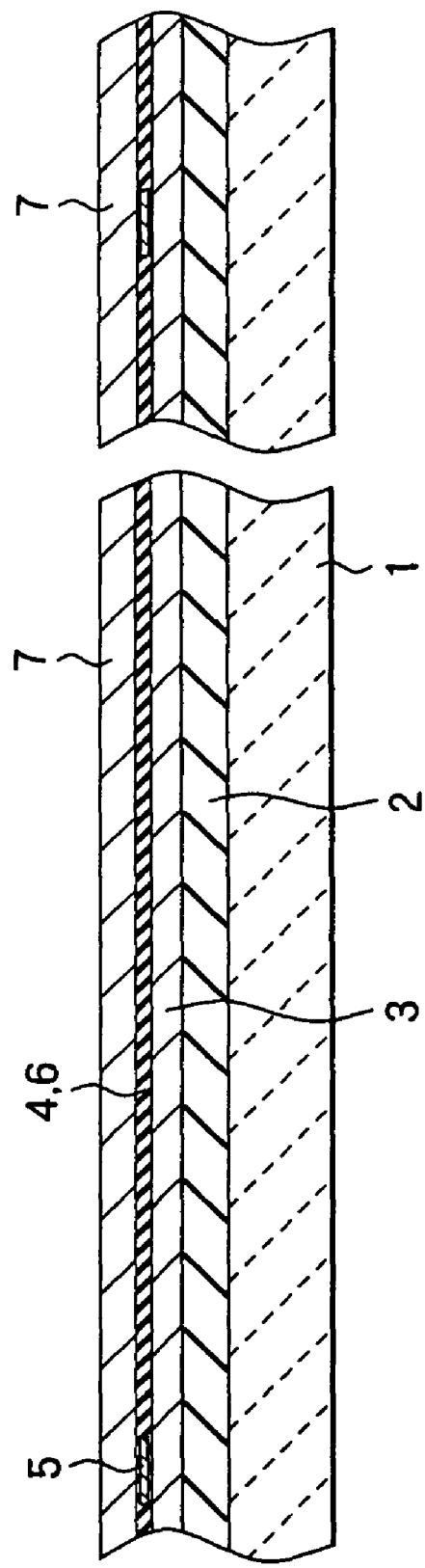
FIGS. 1A and 1B show cross sections for describing a step in a method of manufacturing a thin film magnetic head according to a first embodiment of the invention.
Figure 2:
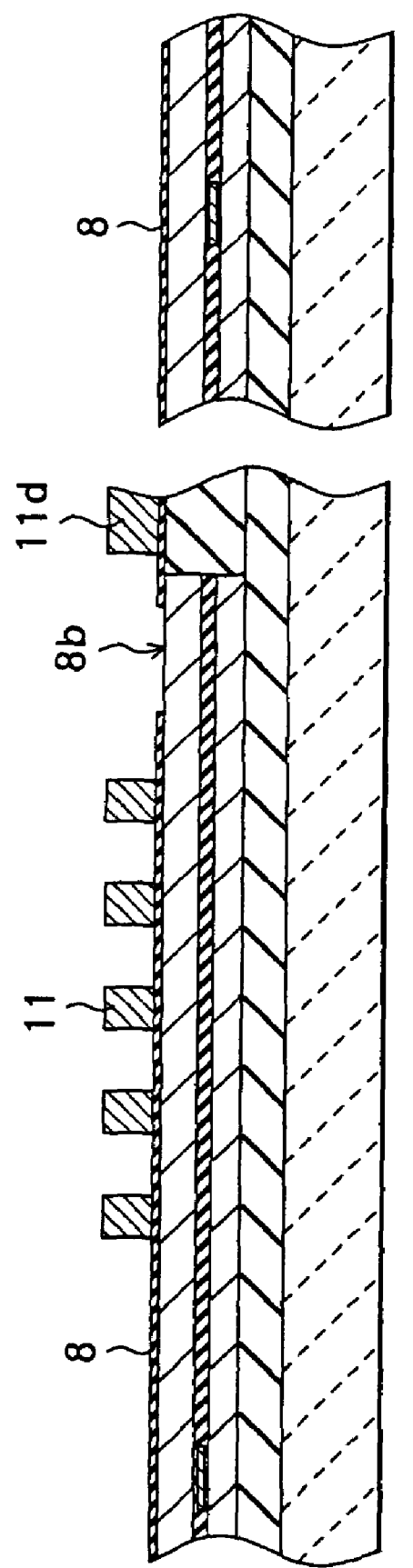
FIGS. 2A and 2B show cross sections for describing a step following FIGS. 1A and 1B.
Figure 3:
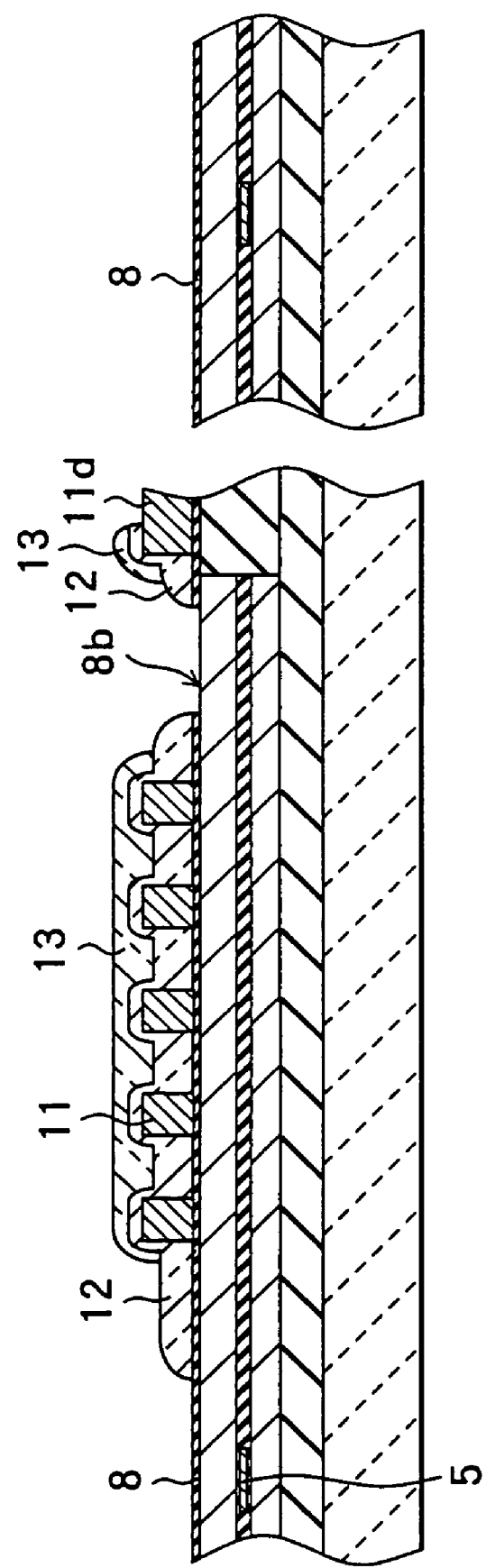
FIGS. 3A and 3B show cross sections for describing a step following FIGS. 2A and 2B.
Figure 4:
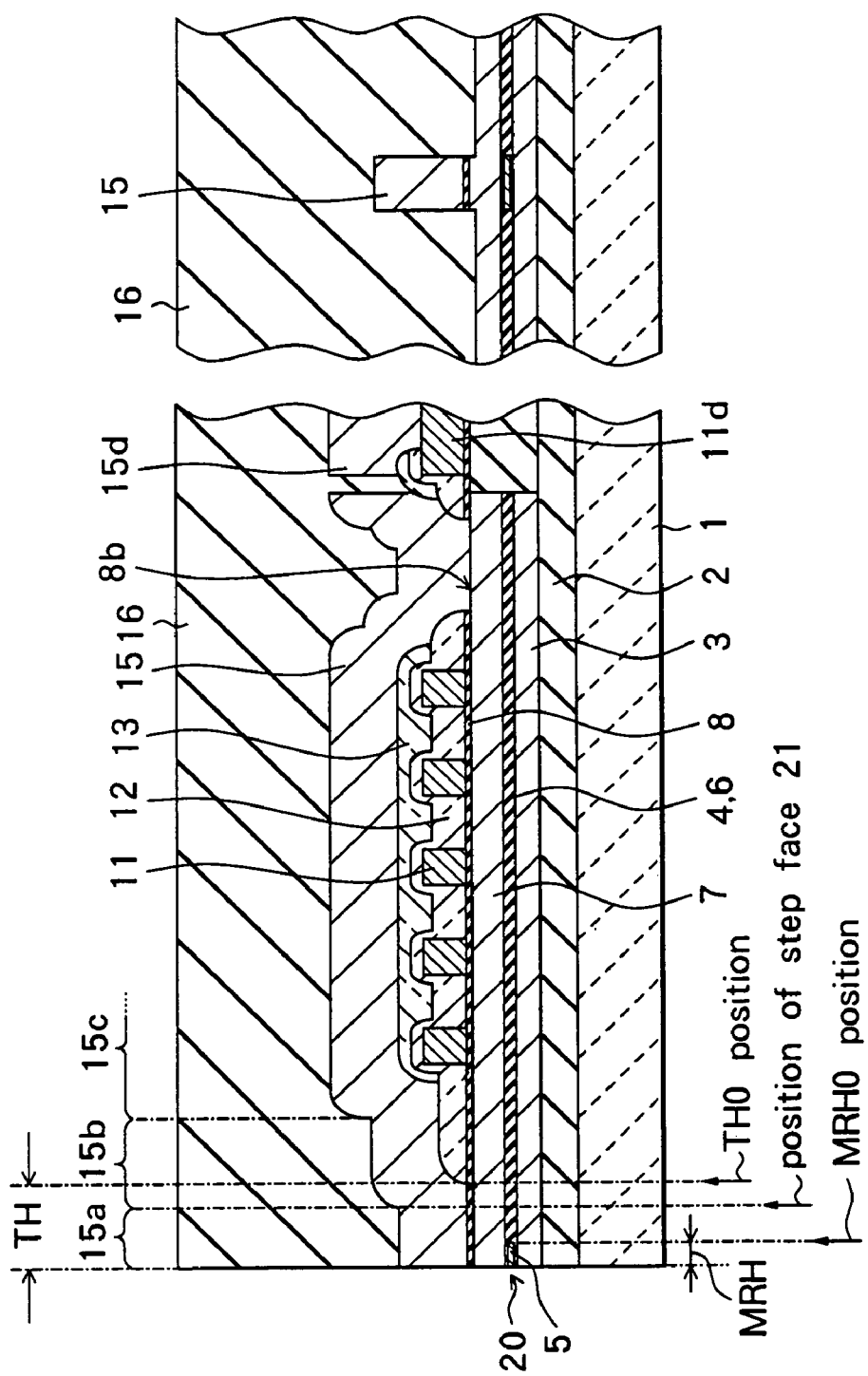
FIGS. 4A and 4B show cross sections for describing a step following FIGS. 3A and 3B.

In the followings, embodiments of the invention will be described in detail with reference to the drawings.

First Embodiment

A method of manufacturing a composite thin film magnetic head will be described with reference to FIGS. 1A, 1B to FIGS. 4A, 4B as a method of manufacturing a thin film magnetic head according to a first embodiment of the invention. A thin film magnetic head of the embodiment will together be described since it is embodied through the method of manufacturing the thin film magnetic head of the embodiment. In FIGS. 1A, 1B to FIGS. 4A, 4B, FIGS. 1A, 2A, 3A and 4A show cross sections vertical to the air bearing surface and FIGS. 1B, 2B, 3B and 4B show a cross sections parallel to the air bearing surface of the magnetic pole.

In the followings, for example, in FIG. 1B, the distance in a right hand to a left hand direction, in the figure, parallel to the air bearing surface is referred to as "width" and in FIG. 1A, the distance in a direction vertical (right hand direction or left hand direction in the figure) to the air bearing surface is referred to as "length." Also, for example, in FIGS. 1A and 1B, the distance in an upward or a downward direction is referred to as "thickness." In addition, for example, in FIG. 1A, the above-mentioned length direction closer (left hand side in the figure) to the air bearing surface is referred to as "front side or front." On the contrary, the length direction further (right hand side in the figure) from the air bearing surface is referred to as "rear side or rear."

[Method of Manufacturing a Thin Film Magnetic Head]

In a method of manufacturing a thin film magnetic head according to the embodiment of the invention, first, as shown in FIGS. 1A and 1B, an insulating layer 2 about 3 to 5 µm thick made of alumina ($Al_2O_3$), for example, is deposited on a substrate 1 made of altic ($Al_2O_3$- and TiC), for example. Then, a bottom shield layer 3 for a reproducing head is formed on the insulating layer 2 by selectively forming permalloy (NiFe) about 3 µm thick through photolithography or plating.

As shown in the figure, for example, alumina about 100 to 200 nm thick is deposited on the bottom shield layer 3 by sputtering to form a shield gap film 4. Then, an MR film 5 for composing an MR element which is the main part of a reproducing head is formed on the shield gap film 4 and is formed to be a desired shape by photolithography with high precision. After a lead layer (not shown in figure) as a lead electrode layer which is electrically connected to the MR film 5 is formed on both sides of the MR film 5, the MR film 5 is buried in the shield gap films 4 and 6 by forming a shield gap film 6 on the lead layer, the shield gap film 4 and the MR film 5. Then, a top shield-cum-bottom pole (simply referred to as a "bottom pole" in the followings) 7 about 3 to 4 µm thick made of permalloy, for example, is selectively formed on the shield gap film 6 by electro-plating, for example. The above-mentioned MR film 5 corresponds to an specific example of a "magnetic transducer film" of the invention.

Next, as shown in FIGS. 2A and 2B, a write gap layer 8 about 0.15 to 0.3 µm thick made of alumina, for example, is formed on the whole. At this time, an opening 8b which is for connecting a bottom pole 7 and the top pole 15 in a later process is formed in the write gap layer 8.

Next, as shown in the figure, a thin film coil 11, for an inductive recording head, 2 to 3 µm thick made of copper (Cu), for example, is formed on the write gap layer 8 by electro-plating, for example. At this time, a coil connection 11d is formed together with the thin film coil 11 as one body on the write gap layer 8 in a region rear of the thin film coil 11. The coil connection 11d is for connecting the thin film coil 11 and a coil connecting wiring 15d (FIG. 4A) which is formed in a later process. The above-mentioned write gap layer 8 corresponds to a specific example of a "gap layer" of the invention and the thin film coil 11 corresponds to a specific example of a "thin film coil" of the invention.

As shown in FIGS. 3A and 3B, a first insulating film 12 made of such as photoresist which exhibits liquidity by applying heat is formed in a predetermined pattern by photolithography with high accuracy so as to cover the thin film coil 11 and the neighboring regions of the write gap layer 8. The first insulating film 12 determines the apex angle and the throat height and is for burying the gaps between the turns of the thin film coil 11. At this time, the surface of the coil connection 11d and the opening 8b of the write gap layer 8 are not to be covered by the first insulating film 12. The end edge on the front side (referred to as "front edge" in the followings) of the first insulating film 12 is located in a position shifted to rear of the position corresponding to the end edge on the rear side (referred to as "rear edge" in the followings) of the MR film 5. The length from the rear edge of the MR film 5 to the front edge of the first insulating film 12 will be described later.

As shown in the figure, a second insulating film 13 made of such as photoresist which exhibits liquidity by applying heat is selectively formed on the first insulating film 12 in a region where the thin film coil 11 is formed.

Next, a heat treatment at 200° C., for example, is applied in order to flatten the first insulating film 12 and the second insulating film 13, and to improve the insulating characteristic between the turns of the thin film coil 11. Through the heat treatment, as shown in FIG. 3A, the peripheral region of the front edge of the first insulating film 12 makes a rounded slope. Also, the peripheral area of the outer edge of the other portion of the first insulating film 12 and the peripheral region of the outer edge of the second insulating film 13 make the rounded slope. The above-mentioned first insulating film 12 corresponds to a specific example of an "insulating film" of the invention and mainly the first insulating film 12 and the second insulating film 13 correspond to a specific example of an "insulating layer" of the invention.

As shown in FIGS. 4A and 4B, before a top pole 15 is formed, an electrode film (not shown in figure) about 70 nm thick as a seed layer in electroplating is formed by sputtering, for example. The electrode film is made of NiFe alloy, for example, which is a material having a high saturation magnetic flux density. Next, a photoresist film (not shown in figure) is formed by applying positive photoresist (simply referred to as "photoresist" in the followings) on the above-mentioned electrode film. Then, a predetermined region of the photoresist film is selectively exposed using a photomask made of metal such as chrome having a predetermined plane pattern. Then, a photoresist pattern (not shown in figure) as a frame used in a frame plating is formed by developing the exposed region of the photoresist film.

At this time, a plurality of selective exposures of the photoresist film are performed using a plurality of kinds of photomasks having different opening patterns and then development of the whole exposed region is performed through one development step. Especially in the embodiment, using two different kinds of photomasks having different opening patterns for the same photoresist film in order, the region of the photoresist film corresponding to the plane shape of the opening of each photomask is selectively exposed through two separate steps, and then the exposed region of the photoresist film is collectively developed. Thereby, the photoresist pattern comprising an opening with plane shape corresponding to the plane shape of the top pole 15 is formed. A method of forming such a photoresist pattern will be described later in detail in FIG. 7.

Next, as shown in the figure, a top yoke-cum-bottom pole (referred to as top pole in the followings) 15 about 3 to 5 µm thick is formed by electro-plating using the electrode film formed in the earlier process as a seed layer, and the photoresist pattern formed in the above-mentioned development process as a mask. Then, the photoresist pattern is removed. The top pole 15 is magnetically coupled to the bottom pole 7 in the opening 8b. The top pole 15 takes a plane shape shown in FIG. 5, for example. The feature of the shape will be described later. When the top pole 15 is formed, a coil connection wiring 15d for electrically connecting the coil connection 11d and an outer circuit (not shown in figure) is formed at the same time. For example, a high-saturation magnetic material such as permalloy (NiFe) or iron nitride (FeN) is used for the top pole 15 and the coil connection wiring 15d. The above-mentioned top pole 15 corresponds to a specific example of "one of two magnetic layers" of the invention.

As shown in FIG. 4B, a trim structure is formed by selectively etching the write gap layer 8 and the bottom pole 7 by about 0.5 µm in a self-aligned manner through dry etching by RIE using chlorine gas ($Cl_2$, $CF_4$, $BCl_2$, $SF_6$ or the like), for example, and using the photoresist film (not shown in figure) selectively formed in a rear region of the front edge of the first insulating film 12 and the portion of the top pole 15 which is front of the front edge of the first insulating film 12 as a mask.

Next, an overcoat layer 16 made of alumina, for example, is formed so as to cover the whole surface. At last, an air bearing surface 20 of the recording head and the reproducing head is formed by performing machine processing on the slider. Thereby, a thin film magnetic head is completed.

[Main Structure of a Thin Film Magnetic Head]

Figure 5:
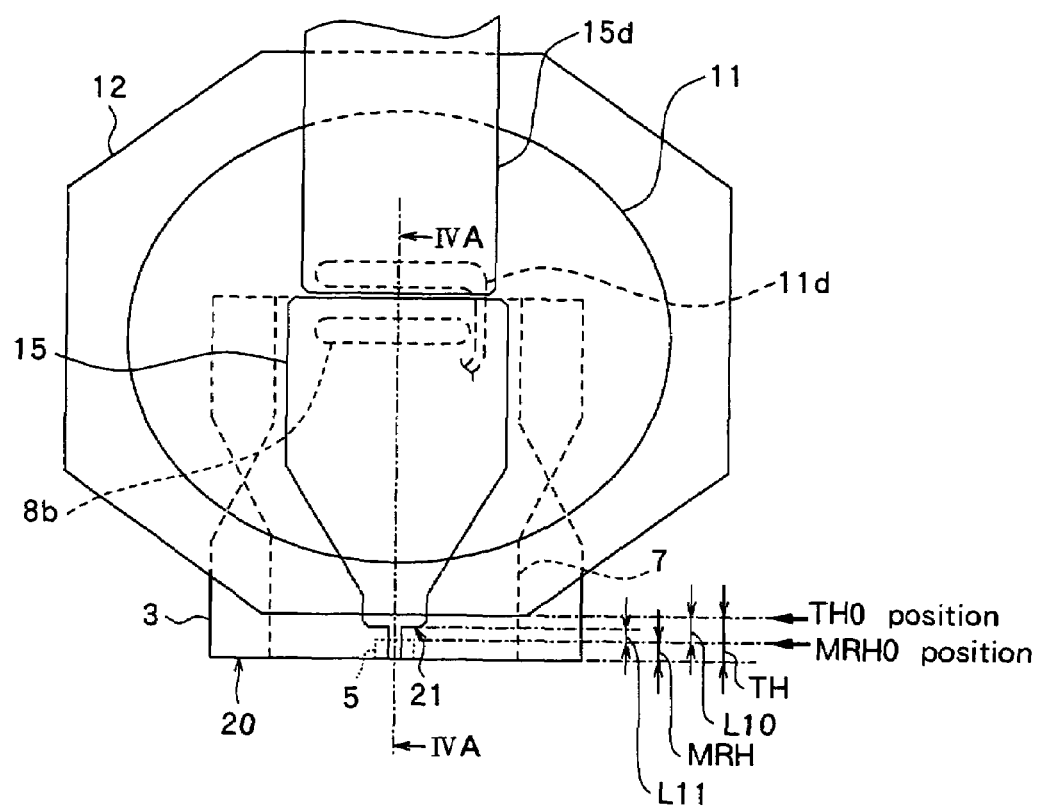
FIG. 5 shows a plan view showing the plane structure of a thin film magnetic head according to the first embodiment of the invention.

FIG. 5 shows a schematic diagram of the plan structure of a thin film magnetic head manufactured through a method of manufacturing a thin film magnetic head according to the embodiment. In FIG. 5, the second insulating film 13, the overcoat layer 16 and the like are omitted.

As shown in FIG. 5, the position of the front edge of the first insulating film 12 is the reference position when the throat height TH is determined, that is, the throat height 0 position (TH0 position). The throat height TH is determined as the length from the position of the front edge of the first insulating film 12 (TH0 position) to the air bearing surface 20. On the other hand, as also shown in FIG. 5, the MR height (referred to as "MRH" in the followings) is the length from the rear edge of the MR film 5 to the air bearing surface 20. In the followings, the position of the rear edge of the MR film 5 is called the MR height 0 position and is referred to as "MRH0 position." It is desirable that the length of the throat height TH is 1.5 to 6 times (150 to 600%) of the length of the MR height (MRH). Specifically, it is more desirable that it is 1.5 to 2 times (150 to 200%) of the length of the MRH. For example, if the MRH=0.5 µm, it is desirable that TH=0.75 to 3.0 µm. Specifically, it is more desirable that TH=0.75 to 1.0 µm. FIG. 4A is a cross-sectional view taken along the line IVA—IVA shown in FIG. 5.

Figure 6:
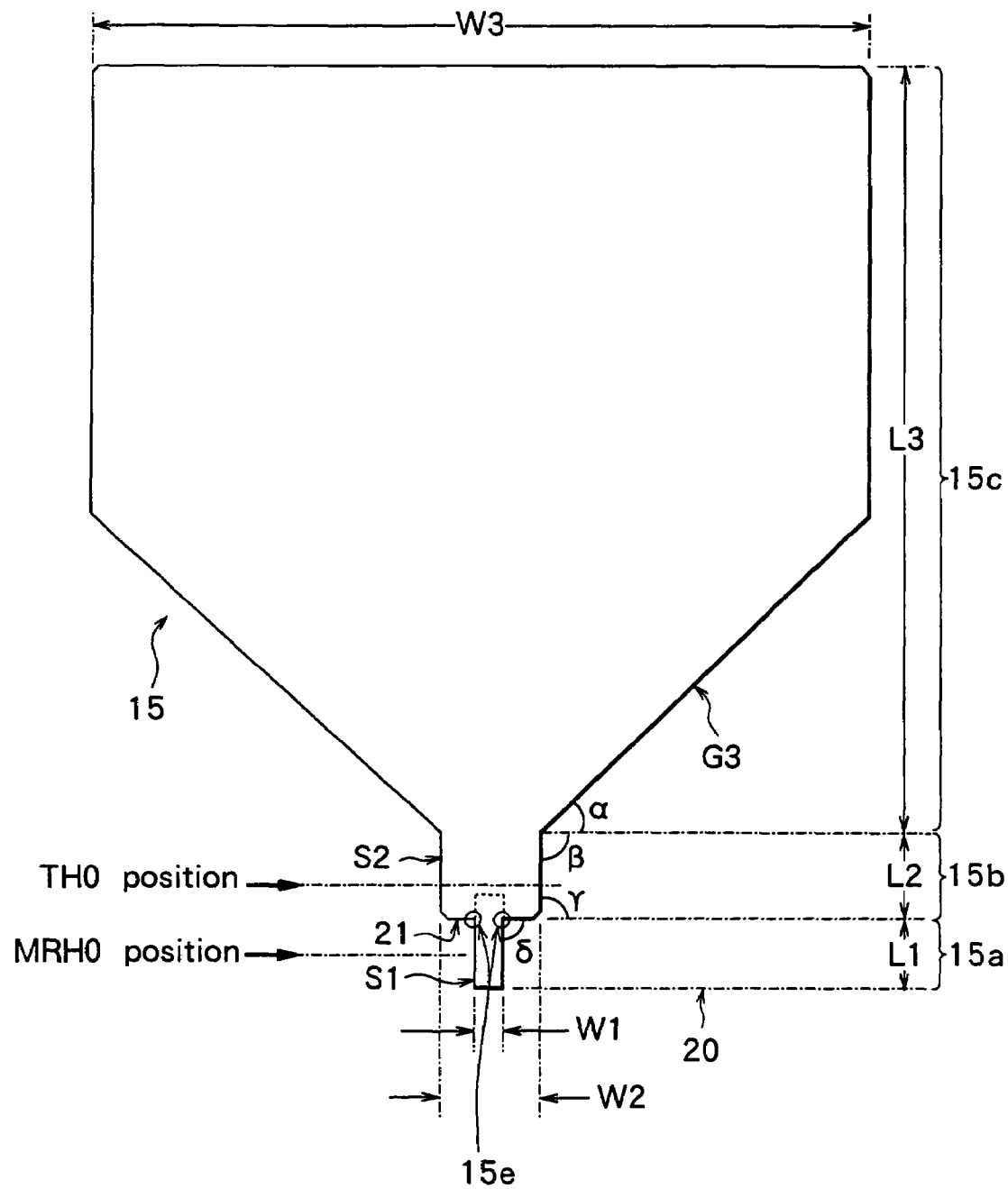
FIG. 6 shows a plan view showing the plan structure of the top pole of the thin film magnetic head shown in FIG. 5.
Figure 35:
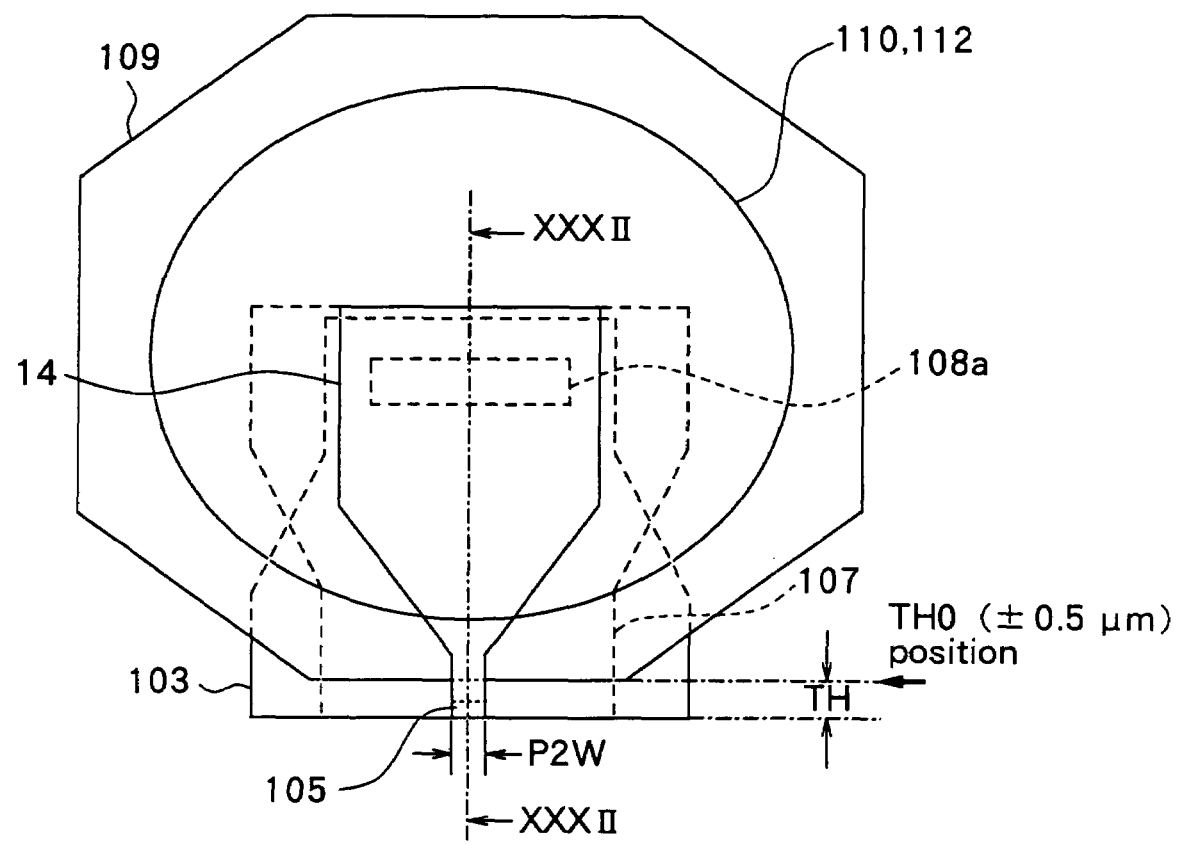
FIG. 35 is a plan view showing the structure of a thin film magnetic head of the related art.

FIG. 6 shows a plan structure of the top pole 15. As shown in the figure, the top pole 15 is composed so that the tip 15a (width W1), the intermediate portion 15b (width W2) and the yoke 15c (width W3) are connected in order from the air bearing surface 20 side. Each width of the above-mentioned portions is set as W3>W2>W1. The center of each portion in each width direction mutually coincides. The widths (W1 and W2) of the tip 15a and the intermediate portion 15b are almost constant in a longitudinal direction. The width W1 of the tip 15a corresponds to the pole width P2W shown in FIG. 35 and determines the write track width on a recording medium. The tip 15a of the top pole 15 corresponds to a specific example of a "first magnetic layer portion", the intermediate portion 15b to a specific example of a "second magnetic layer" and the yoke 15c to a specific example of a "third magnetic layer" of the invention.

The width of the front portion of the yoke 15c becomes gradually narrower from W3 to W2. In the connection of the intermediate portion 15b and the yoke 15c, an outer edge G3 of the front portion of the yoke 15c forms an angle α with the surface parallel to the air bearing surface 20. Also, in the above-mentioned connection, a side end surface S2 of the intermediate portion 15b makes an angle β with the surface parallel to the air bearing surface 20. In the embodiment, the angle a is about 45 degrees, for example, and the angle β is about 90 degrees, for example.

A step in the width direction is formed in the connection of the tip 15a and the intermediate portion 15b. The end edge surface (referred to as "step surface" in the followings) on the intermediate portion 15b side in the step makes an angle γ with the side end surface S2 of the intermediate portion 15b, and forms an angle δ with the side end surface S1 of the tip 15a. In the embodiment, both of the above-mentioned angle γ and angle δ are about 90 degrees. In other words, the corner 15e between the side end surface S1 of the tip 15a and the step surface 21 takes a right-angled shape. The step surface 21 is parallel to the air bearing surface 20.

Now, the position of the step surface 21 in the connection of the tip 15a and the intermediate portion 15b, which is one of the distinctive structural characteristic of a thin film magnetic head of the invention, is described with reference to FIG. 5.

As shown in FIG. 5, the step surface 21 is located in a position which is front of the front edge of the first insulating film 12 (TH0 position) and rear of the rear edge of the MR film 5 (MRH0 position). The length L11 from the MRH0 position to the step surface 21 is about 0.25 µm to 2.5 µm, for example, and is more preferable to be about 0.25 µm to 0.5 µm.

As can be seen from FIGS. 4A, 4B to FIG. 6, the tip 15a extends on the flat write gap layer 8, and the intermediate portion 15b and the yoke 15c extend on the apex area which mainly comprises the first insulating film 12 and the second insulating film 13 and rises like a mountain.

It is preferable that the measurement value of each portion shown in FIG. 6 is as follows, for example.

Length L1 of the tip 15a=0.3 to 0.8 µm
Length L2 of the intermediate portion 15b=3.0 to 5.0 µm
Length L3 of the yoke 15c=10.0 to 40.0 µm
Width W1 of the tip 15a=0.2 to 0.5 µm
Width W2 of the intermediate portion 15b=1.2 to 3.5 µm
Width W3 of the yoke 15c=10.0 to 20.0 µm

[Operation of a Thin Film Magnetic Head]

The operation of the thin film magnetic head of the embodiment will be described.

First, the basic operation of the thin film magnetic head, that is, recording operation of data on a recording medium and reproducing operation of data from the recording medium, will be briefly described.

In the thin film magnetic head of the embodiment, when current is flown into the thin film coil 11 during an operation of recording information, magnetic flux generates. The generated magnetic flux propagates from the yoke 15c of the top pole 15 to the tip 15a via the intermediate portion 15b. The magnetic flux propagated to the tip 15a further reaches the end portion on the air bearing surface 20 side and generates signal magnetic field for recording outside the neighboring region of the write gap layer 8. Information can be recorded through partially magnetizing a magnetic recording medium by the signal magnetic field. In a thin film magnetic head which performs such recording operation, it is necessary to supply the magnetic flux generated in the thin film coil 11 to the end portion of the tip 15c smoothly and sufficiently in order to maintain the excellent overwrite performance.

On the other hand, when reproducing information, sense current is flown into the MR film 5 of a reproducing head. The resistance value of the MR film 5 changes according to the reproduction signal magnetic field from the magnetic recording medium. Therefore, information recorded in the magnetic recording medium can be read out by detecting the resistance change by the change of the sense current.

Next, the distinctive operation of the thin film magnetic head of the embodiment will be described.

In the thin film magnetic head of the embodiment, as shown in FIG. 6, a step in a width direction is formed in the connection of the tip 15a of the top pole 15 and the intermediate portion 15b. The width W2 of the intermediate portion 15b is greater than the width W1 of the tip 15a which is to determine the write track width. The area of the intermediate portion 15b is larger than the area of the tip 15a and smaller than the area of the yoke 15c.

Figure 36:
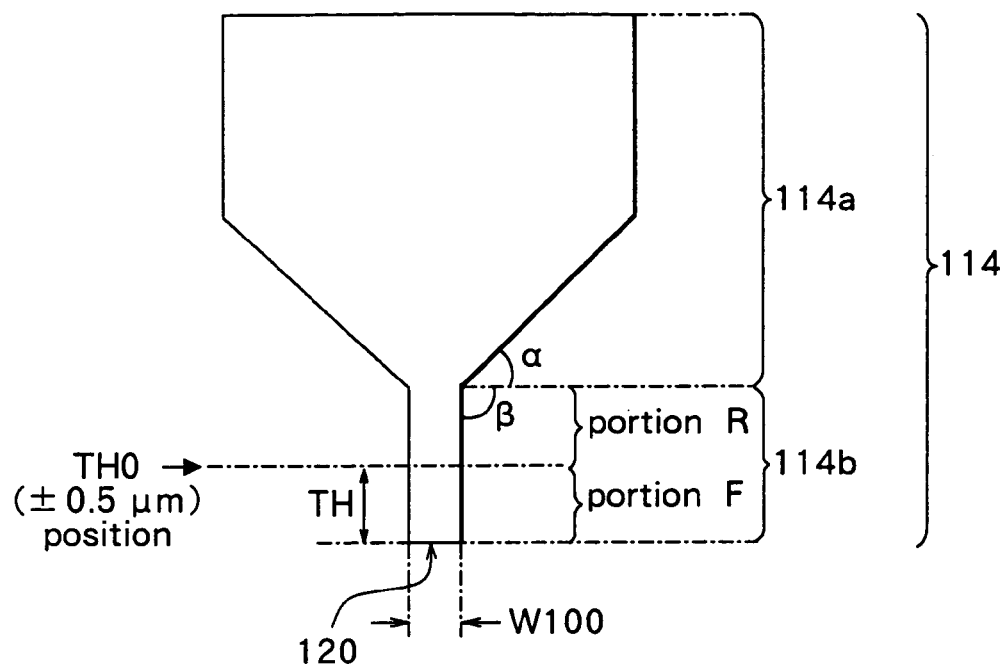
FIG. 36 is a plan view showing the structure of the top pole in a thin film magnetic head of the related art.

The maximum amount of the magnetic flux (referred to as "magnetic volume" in the followings) which can be stored inside each portion (the tip 15a, the intermediate portion 15b and the yoke 15c) composing the top pole 15 depends on the area of each portion provided that the thickness of each portion is constant. The magnetic volume of each portion composing the top pole 15 has a great influence on how the magnetic flux flowing in each portion of the top pole 15 propagates. At this time, each magnetic volume of the tip 15a, the intermediate portion 15b and the yoke 15c composing the top pole 15 is referred to as Va, Vb and Vc. In the embodiment, correlation of each magnetic volume is Vc>Vb >Va. Therefore, the magnetic flux generated in the thin film coil 11 is accordingly converged as it propagates from the yoke 15c to the tip 15a via the intermediate portion 15b. The magnetic volume of the intermediate portion 15b is greater than the magnetic volume of the corresponding portion of the top pole 114 of the related art (FIG. 36).

As described above, the tip 15a of the top pole 15 determines the write track width on a recording medium at the time of recording information. Therefore, it is necessary that the width W1 of the tip 15a is extremely minute corresponding to the write track width in order to achieve narrow track for high density recording. In this case, in order to avoid saturation of the magnetic flux inside the tip 15a so that the sufficient magnetic flux reaches the air bearing surface, it is necessary that, as a rule, the throat height TH is to be as short as possible. On the other hand, when the throat height TH is excessively shortened, the magnetic flux directly leaks from the wide portion of the yoke 15c of the top pole 15 to the air bearing surface. As a result, there is a possibility that there may be a bad influence on the precision of the write track width. In other words, there are practically two conflicting needs such as lengthening (maintaining the required minimum length) of the throat height TH and shortening of the tip 15a.

Therefore, in the embodiment, as shown in FIG. 6, the step surface 21 in the step of the top 15a and the intermediate portion 15b is actively located in the front of the TH0 position. Thereby, the intermediate portion 15b with a wider width than the tip 15a with a minute width is provided in the front of the TH0 position in order to maintain the magnetic volume in the throat height TH portion. As a result, lengthening of the throat height TH and shortening of the tip 15a are simultaneously achieved. Therefore, even in a case where the width W1 of the tip 15a is microfabricated, saturation of magnetic flux inside the tip 15a can be avoided and sufficient signal magnetic field in the air bearing surface 20 can be maintained while the write track width can be improved by lengthening the throat height TH.

Also, it is necessary that the width of the tip 15a in the longitudinal direction has the constant width W1 through the whole portion. It is because if the width of the tip 15a is greater than W1, the write track width on a recording medium becomes greater than W1, accordingly. Thereby, sidewrite, that is, writing on the region other than the predetermined region of the write track on the recording medium, occurs. Therefore, in the embodiment, as will be described later, photoresist pattern used for forming the top pole 15 by plating is formed by performing two exposure steps and one development step so that, as shown in FIG. 6, the corner 15e between the side edge surface S1 of the tip 15a and the step surface 21 makes a right angle. The tip 15a in the longitudinal direction has the constant width W1 through the whole portion so that the above-mentioned sidewrite can be avoided.

As described in FIG. 5, it is desirable that the position of the step surface 21 in the top pole 15 is in front of the TH0 position and rear of the MRH0 position. It is because if the step surface 21 is excessively closer to the air bearing surface 20 than the MRH0 position, sidewrite occurs caused by direct discharging of magnetic flux from the intermediate portion 15b, which has a greater width W2 than the width W1 of the tip 15a, to the air bearing surface 20.

As described, in the thin film magnetic head of the embodiment, the intermediate portion 15b having a greater width W2 than the width W1 of the tip 15a is provided between the tip 15a of the top pole 15 and the TH0 position so that sufficient magnetic volume can be maintained therein. Thereby, saturation of the magnetic flux flown into the tip 15a from the yoke 15c inside the tip 15a having a minute width can be suppressed and the magnetic flux sufficiently reachs the air bearing surface 20. As a result, an excellent overwrite performance can be maintained. Also, the intermediate portion 15b having a wide width is provided in the throat height TH. Therefore, the throat height TH can be lengthened without excessively lengthening the length L1 of the tip 15a having a constant width which determines the write track width, and the write track width on the recording medium can be improved.

In the embodiment, the corner 15e between the side edge surface S1 of the tip 15a and the step surface 21 in the top pole 15 makes a right angle in order to suppress widening of the width of the tip 15a which determines the write track width of the recording medium. Thereby, sidewrite can be avoided when writing information.

Also, in the embodiment, the position of the step surface 21 in the top pole 15 is in front of the TH0 position and rear of the MRH0 position. As a result, sidewrite caused by discharging of magnetic flux from the intermediate portion 15b can be avoided.

[Method of Manufacturing the Top Pole 15]

Next, a method of manufacturing the top pole 15 which is one of distinctive characteristic of the embodiment will be described in detail with reference to FIGS. 7A to 7D and FIGS. 8A and 8B.

In a method of manufacturing the thin film magnetic head of the embodiment, as described, the photoresist pattern used for forming the top pole 15 is formed by performing a plurality of exposures on the same photoresist film using a plurality of photomasks. By using a photoresist pattern formed in such a manner, the corner 15e between the side edge surface S1 of the tip 15a and the step surface 21 can be formed to have a right angle. Thereby, the width of the tip 15c can be precisely made constant. In the followings, description will be proceeded in this respect.

Figures 7A, 7B:
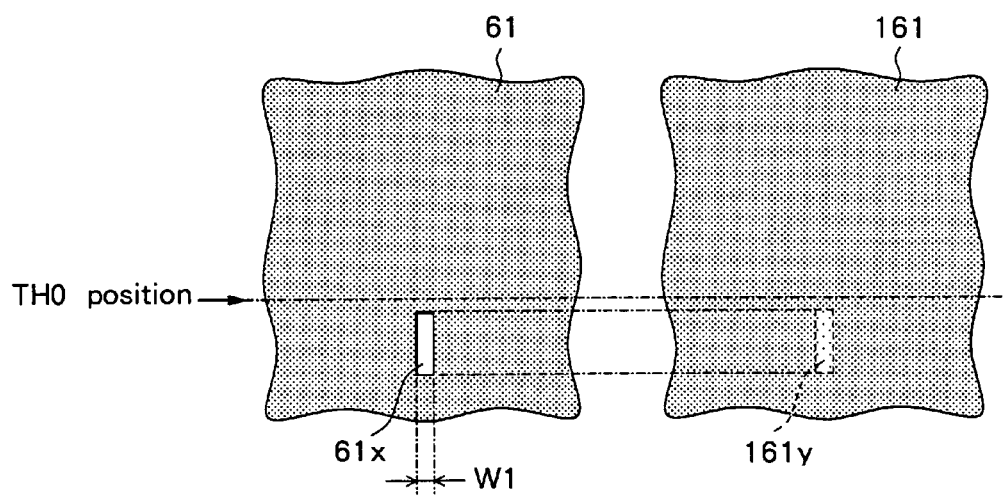
FIGS. 7A to 7D show plan views for describing the manufacturing step of the top pole in a method of manufacturing a thin film magnetic head according to the first embodiment of the invention.
Figures 7C, 7D:
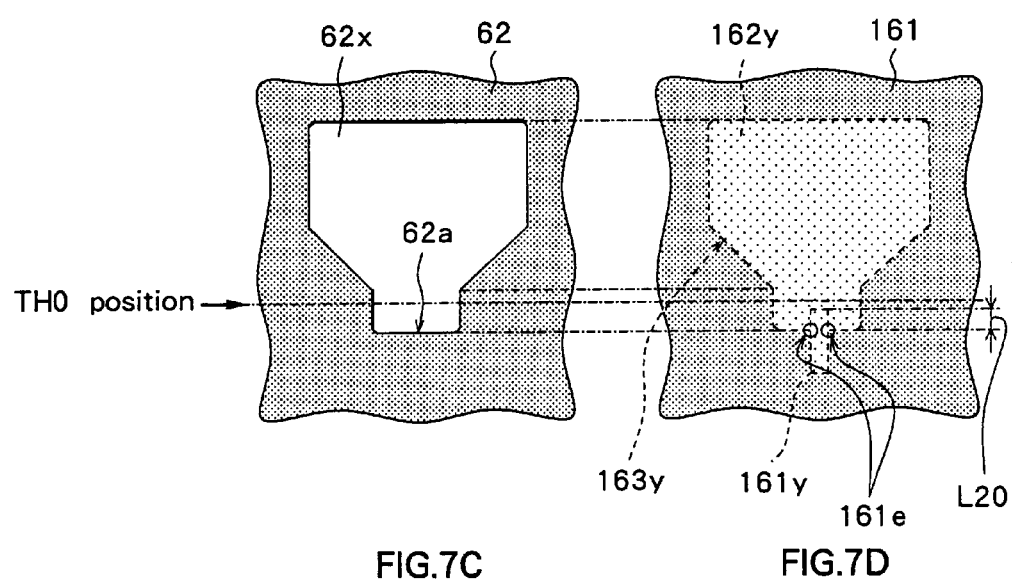
Figures 8A, 8B:
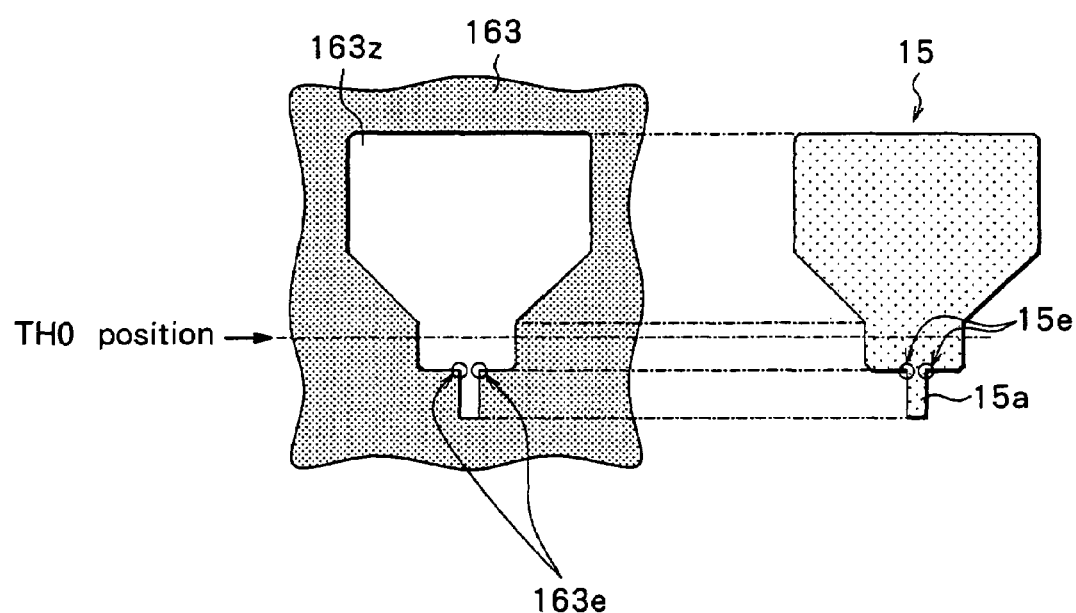
FIGS. 8A and 8B are plan views showing a step following FIGS. 7A to 7D.

In FIGS. 7A to 7D, FIG. 7A shows a plan view of a first photomask used in the first exposure step and FIG. 7B shows a plan view of the region (region of the first exposure 161y) of a photoresist film 161 which is exposed by the first exposure step. FIG. 7C shows a plan view of a second photo mask 62 used in the second exposure step and FIG. 7D shows a plan view of the exposure region (the second exposure region 162y) of the photoresist film 161 which is exposed by the second exposure step. FIG. 8A shows a plan view of a photoresist pattern 163 attained by developing the whole exposed region of the photoresist film 161 shown in FIG. 7D, and FIG. 8B shows a plan view of the top pole 15 formed by using the photoresist pattern 163.

The photomask 61 shown in FIG. 7A has an opening 61x (width W1) which is longer than the plane shape corresponding to the tip 15a in the top pole 15 (FIG. 6). The opening 61x has almost a constant width at any points in the longitudinal direction. As shown in FIG. 7B, in the first exposure step, the first photomask 61 is provided in a predetermined position on the photoresist film 161 and a predetermined region of the photoresist film 161 is selectively exposed through the opening 61x of the photomask 61.

At this time, the "predetermined position" on the photoresist film 161 provided in the first photomask 61 is the corresponding position where the tip 15a of the top pole 15 is to be formed in a later process. When providing the photomask 61, alignment of the position against the photoresist film 161 is performed with the TH0 position being the reference point. Specifically, the first exposure step is performed by aligning the position of the opening 61x against the flat region of the photoresist film 161 formed on the flat write gap layer 8 so that the whole portion of the tip 15a of the top pole 15 is formed on the flat write gap layer 8.

Figure 37:
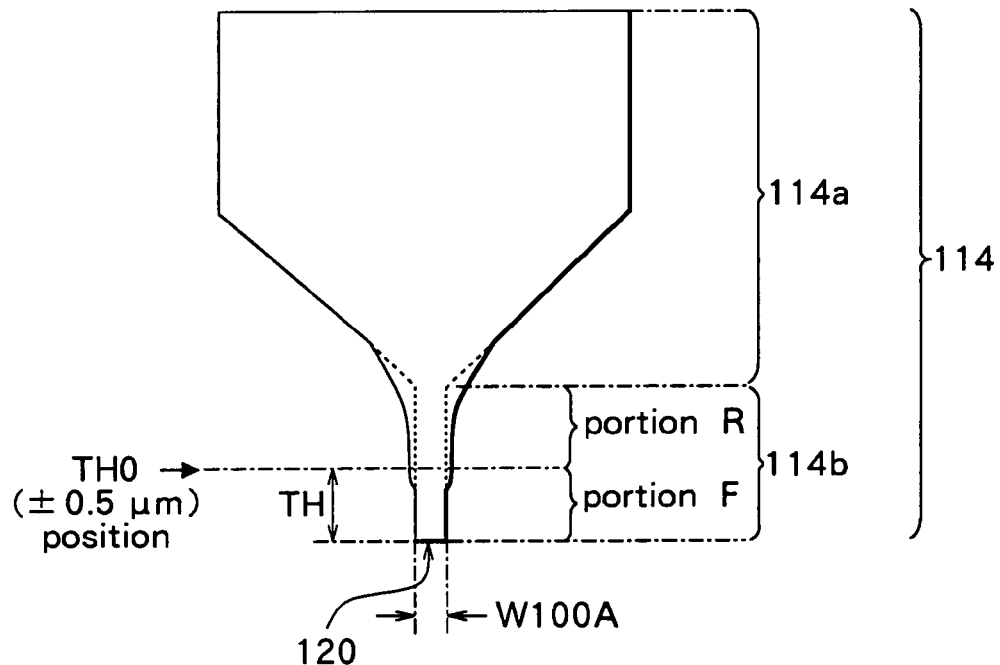
FIG. 37 is a plan view of the top pole for describing problems which occur when the top pole of a thin film magnetic head of the related art is microfabricated.

Through the first exposure step, a first exposed region 161y is formed in the photoresist film 161. The first exposed region 161y is a region which is extendedly lengthened in a rear direction of the region corresponding to the tip 15a of the top pole 15, however, the rear edge is not to reach the TH0 position. As described, by performing the first exposure step only in the portion of the photoresist film 161 formed on the flat write gap layer 8, influence by the reflecting light from the slope of the undercoating shown in FIG. 37 can be avoided. Thereby, widening of the width of the first exposed region in the photoresist film 161 can be suppressed.

A photomask 62 shown in FIG. 7C has an opening 62x having a plane shape which corresponds to the intermediate portion 15b and the yoke 15c in the top pole 15 (FIG. 6). As shown in FIG. 7D, in the second exposure step, the photomask 62 is provided in a predetermined position on the photoresist film 161 having the first exposed region 161y and a predetermined region of the photoresist film 161 is selectively exposed through the opening 62x of the photomask 62. When providing the photomask 62, alignment of the position is performed so that the front edge 62a of the opening 62x of the second photomask 62 overlaps the rear end region of the first exposed region 161y in a manner that the front edge 62a of the opening 62x of the second photomask 62 crosses the longitudinal direction (top-and-bottom direction in the figure) of the first exposed region 161y at right angles. Thereby, a compound exposed region 163y which includes the overlapped region of the rear end region (the upper portion in the figure) of the first exposed region 161y and the second exposed region 162y is formed. The corner 161e of the compound exposed region 163y corresponding to the corner 15e (FIG. 6) of the top pole 15 has a right angle. Exposure of the photoresist film on the flat portion and exposure of the photoresist film on the slope are performed separately, which is different from the method of the related art in which the region from the portion corresponding to the track width to the portion corresponding to the yoke is collectively exposed by one exposure shown in FIG. 37. Therefore, bad influence by the reflecting light from the slope of the undercoating can be avoided.

Also, in the embodiment, bad influence by defocus caused by difference in the height of the undercoating can be avoided. In the flat portion and the slope, the best focus position during exposure is naturally different. Therefore, if the flat portion and the slope are collectively exposed as in the related art, defocus occurs in both or either of them. On the contrary, in the embodiment, the flat portion and the slope are separately exposed so that exposure with the best focus in each portion can be performed. As a result, patterning can be performed sharply.

At last, a photoresist pattern 163 having an opening 163z shown in FIG. 8A is formed by collectively developing the compound exposed region 163y of the photoresist film 161. The plan shape of the opening 163z corresponds to the plan shape of the top pole 15 (FIG. 6). The shape of the opening 163z of the photoresist pattern 163 almost reflects the plan shape of the compound exposed region 163y shown in FIG. 7D. Therefore, the shape of the top pole 15 formed through plating process using the photoresist pattern 163 has, as shown in FIG. 8B, the right angled corner 15e between the connection of the tip 15a and the intermediate portion 15b, and the width of the tip 15a from the corner 15e to the air bearing surface is precisely constant at any point in the longitudinal direction.

In addition, the method of manufacturing the thin film magnetic head of the embodiment has the following advantages. In the method, the thin film coil 11 is formed on the flat write gap layer 8 so that microfabrication of the thin film coil can be precisely performed compared to a case where the thin film coil 11 is formed on the undercoating with the uneven surface. Also, the first insulating film 12 which buries the turns of the thin film coil 11 determines the throat height TH at the same time. Therefore, it is not necessary to separately form an insulating film which buries the turns of the thin film coil 11 and an insulating film which determines the throat height TH so that the process can be simplified.

[Modification Example of a Method of Manufacturing a Top Pole]

Figures 9A, 9B:
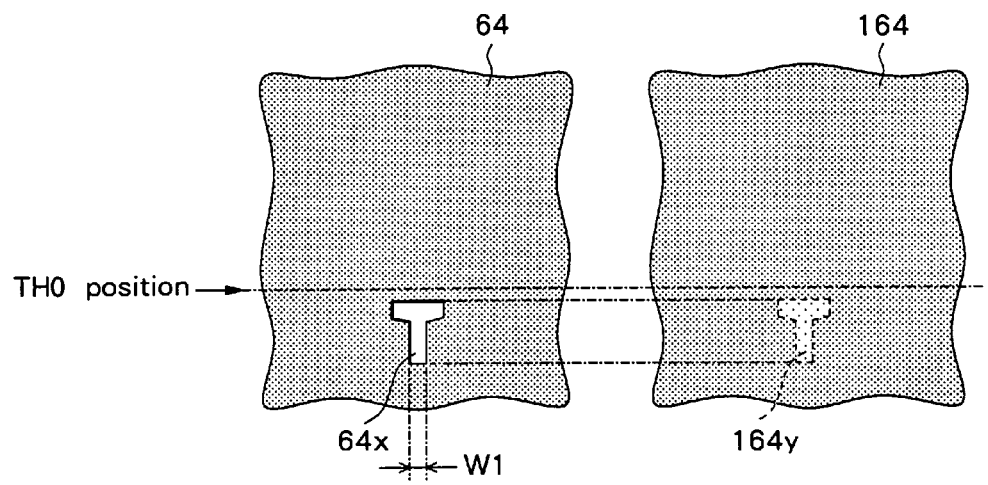
FIGS. 9A to 9D show plan views for describing the manufacturing step of the top pole in a modification example of the first embodiment of the invention.

In the embodiment, the first photomask used in the first exposure step is not limited to the one shown in FIG. 7A. For example, as shown in FIG. 9A, the first exposure step may be performed using a first photomask 64 having an opening 64x with a T-shaped plan shape. In the followings, a modification example of a method of manufacturing the top pole 15 will be described with reference to FIGS. 9A to 9D and FIGS. 10A and 10B.

Figures 9C, 9D:
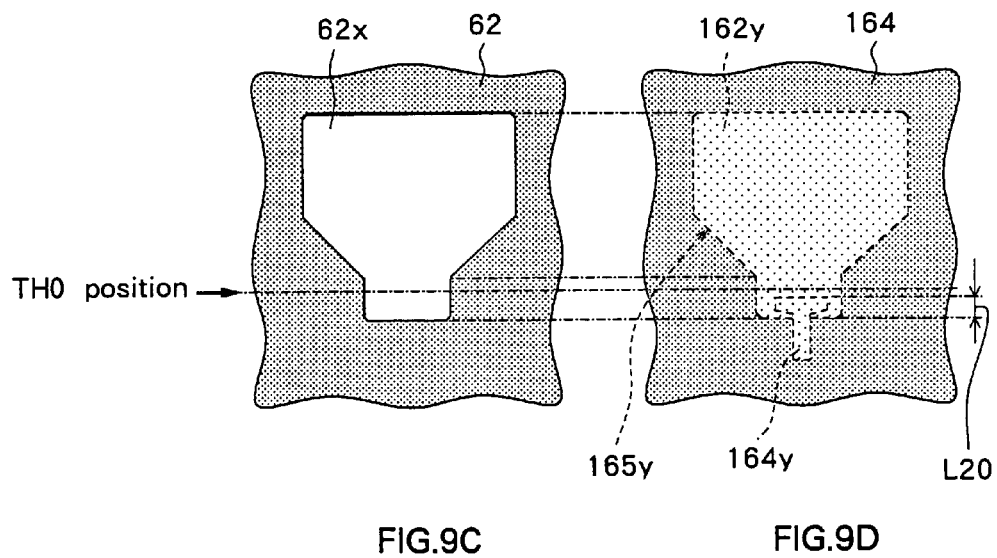
Figures 10A, 10B:
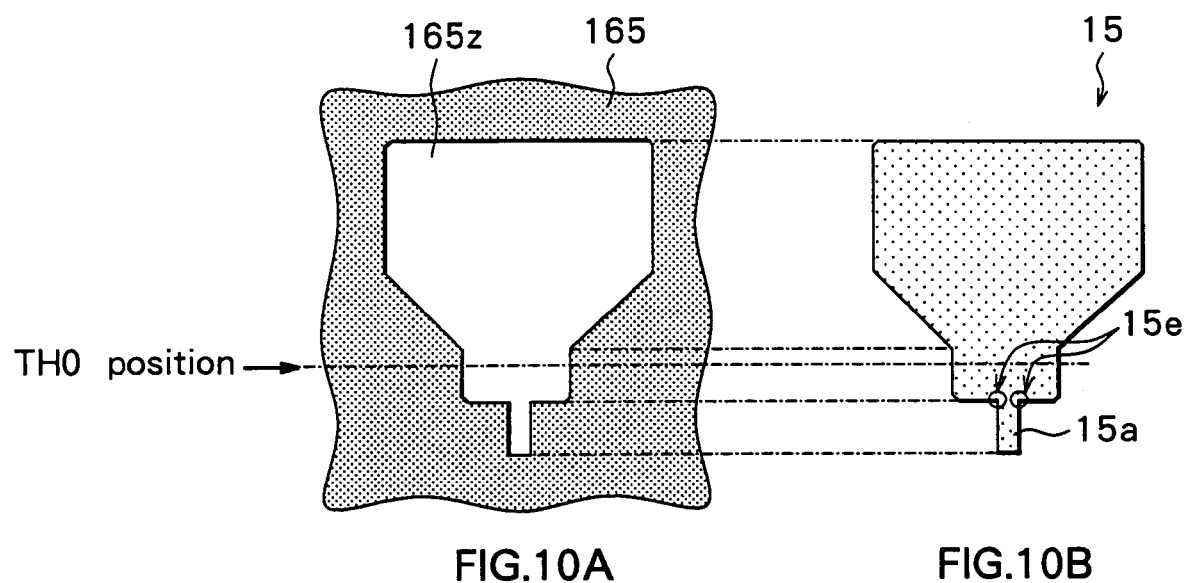
FIGS. 10A and 10B are plan views showing a step following FIGS. 7A to 7D.

FIG. 9A shows a plan view of the first photomask 64 used in the first exposure step of the modification example and FIG. 9B shows a plan view of the region (the first exposed region 164y) of the photoresist film 164 exposed by the first exposure step. FIG. 9C shows a plan view of the second photomask 62 used in the second exposure step and FIG. 9D shows a plan view of the region (the second exposed region 162y) of the photoresist film 164 exposed by the second exposure step. FIG. 10A shows a plan view of the photoresist pattern 165 attained by developing the exposed region of the photoresist film 164 shown in FIG. 9D. FIG. 10B shows a plan view of the top pole 15 formed by using the photoresist pattern 165. In FIGS. 9C and 9D, identical reference numerals are adopted to the same composing elements as the elements used in FIGS. 7C and 7D.

In the modification example, the photomask having the opening 64x with a T-shaped plan shape as shown in FIG. 9A is used as the first photomask 64. The opening 64x includes a portion with a constant width and a rear portion with a greater width. By performing the first exposure step using the photomask 64, as shown in FIG. 9B, the first exposed region 164y having a T-shaped plane shape is formed in the photoresist film 164.

The second exposure step is performed by using the same photomask 62 (FIG. 9C) as the one shown in FIG. 7C. Thereby, as shown in FIG. 9D, the second exposed region 162y is formed in the photoresist film 164 so as to partially overlap the rear portion of the first exposed region 164y. After all, a compound exposed region 165y with a portion being partially double-exposed, which includes the first exposed region 164y and the second exposed region 162y, is formed in the photoresist film 164. The plane shape of the compound exposed region 165y is identical to the case shown in FIG. 7D and corresponds to the plane shape of the top pole 15 (FIG. 6).

A photoresist pattern 165 having an opening 165z is formed by, as shown in FIG. 10A, collectively developing the exposed region 165y of the photoresist film 164. The photoresist pattern 165 has the shape identical to the photoresist pattern 163 shown in FIG. 8A. Accordingly, the opening 165z of the photoresist pattern 165 has the plan shape identical to the opening 163z of the photoresist pattern 163.

The shape of the top pole 15 formed through a plating process using the photoresist pattern 165 which is formed as described has basically the identical characteristic to the top pole described in FIG. 8B. Specifically, as shown in FIG. 10B, the connection of the tip 15a and the intermediate portion 15b has the right-angled corner 15e and the tip 15a from the connection to the air bearing surface has a precisely constant width at any point in a longitudinal direction.

Now, a distinctive operation of the modification example will be described with reference to FIG. 11 to FIGS. 13A and 13B.

Figure 11:
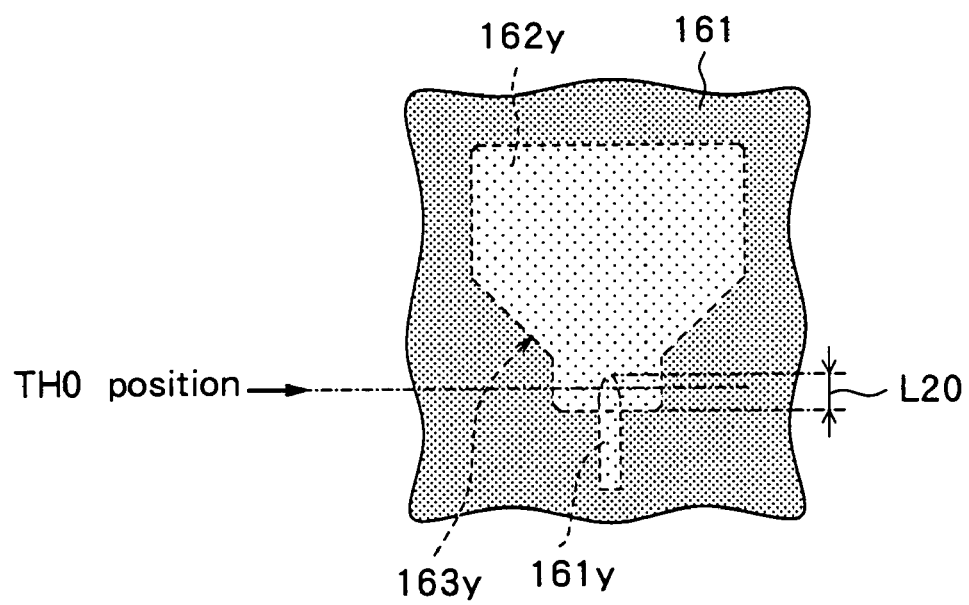
FIG. 11 shows a plan view for describing the operation of the first embodiment.

In the example shown in FIG. 7D, the length L20 of the overlapped region of the first exposed region 161y and the second exposed region 162y is sufficient. However, for example, if the length of the intermediate portion 15b is required to be shortened, it is necessary to shorten the length L20 of the overlapped region as much as possible. If the length L20 is excessively long, as shown in FIG. 11, the first exposed region 161y goes over the TH0 position reaching over the first insulating film 12. As a result, as described, bad influence by the reflection from the undercoating can not be avoided. Therefore, it is preferable that the length L20 of the overlapped region of both exposed regions is shortened as much as possible.

Figures 12A, 12B:
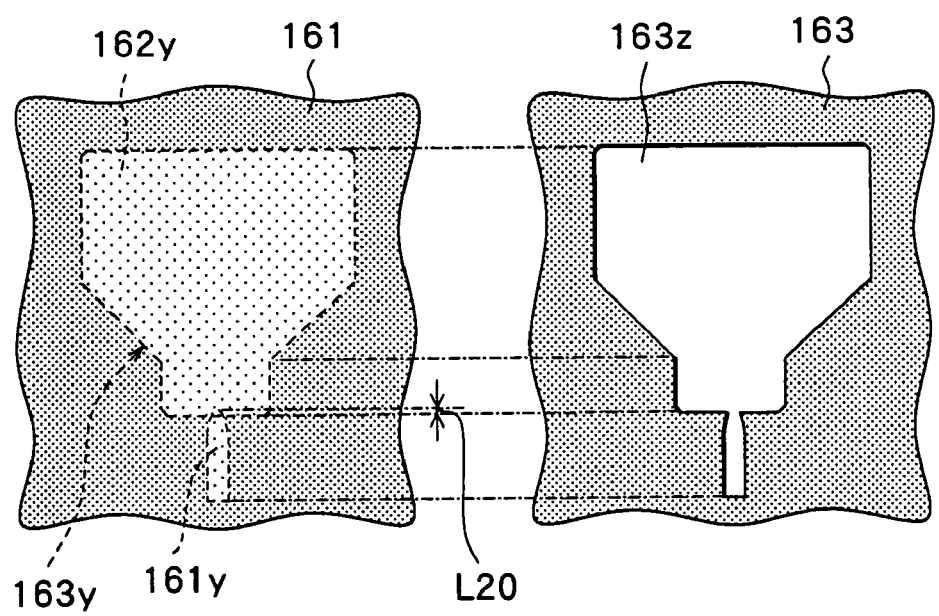
FIGS. 12A and 12B show other plan views for describing the operation of the first embodiment.

However, in a case where the first exposed region has only the portion with a constant width, the following problems occur if the length L20 of the overlapped region of both exposed regions is excessively shortened. That is, as shown in FIG. 12A, for example, the rear end portion of the first exposed region 161y is rounded in the first exposure step. As a result, as shown in FIG. 12B, the width of the opening 163z of the photoresist pattern 163 formed at last, which corresponds to the overlapped region of the first exposed region 161y and the second exposed region 162y, becomes extremely narrow and takes a squeezed shape. The portion corresponding to the overlapped region of the photoresist pattern 163 is reflected by the shape of the connection of the tip 15a and the intermediate portion 15b of the top pole 15 formed by using the photoresist pattern 163. In other words, the region between the tip 15a and the intermediate portion 15b of the top pole 15 becomes narrow. This is a serious problem when the magnetic flux propagates from the intermediate portion 15b to the end portion 15a.

Figures 13A, 13B:
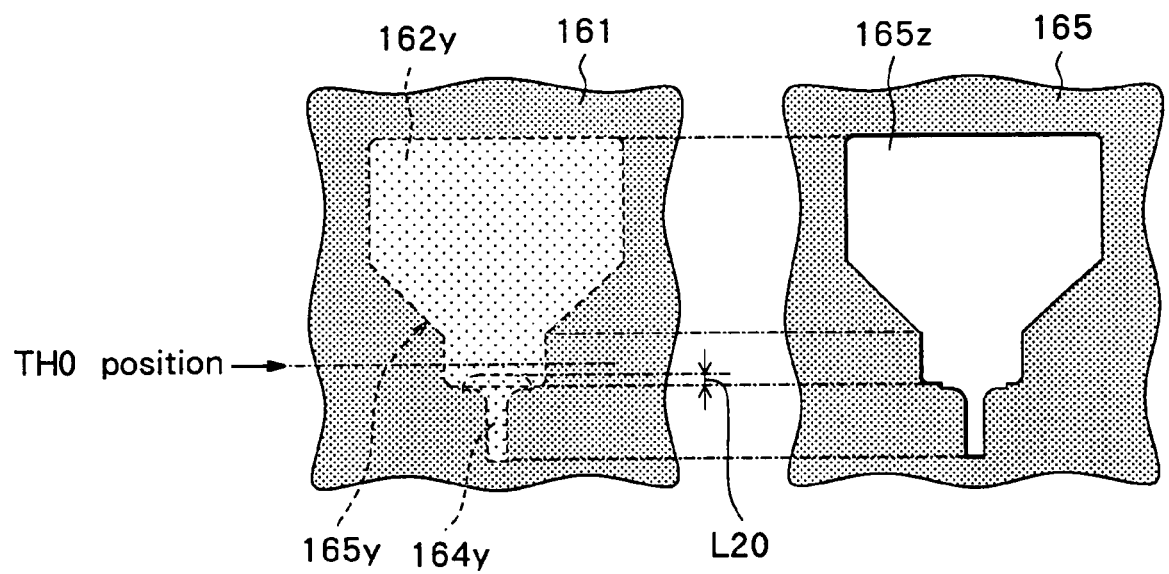
FIGS. 13A and 13B show plan views for describing the operation of the modification example of the first embodiment.

On the contrary, in a case where the first exposed region 164y is T-shaped as shown in FIG. 9D in the modification example, the connection with a sufficient width is formed in the portion corresponding to the overlapped region of the first exposed region 164y and the second exposed region 162y of the photoresist pattern 165 (FIG. 13B) formed at last even if, for example, as shown in FIG. 13A, the rear portion of the first exposed region 164y is rounded. In this case, the width of the portion corresponding to the connection of the tip 15a and the intermediate portion 15b of the top pole 15 formed at last can be sufficiently maintained so that the magnetic flux smoothly propagates from the intermediate portion 15b to the tip 15a. As a result, a sufficient overwrite performance can be maintained.

Second Embodiment

A second embodiment of the invention will be described.

Figures 14A, 14B:
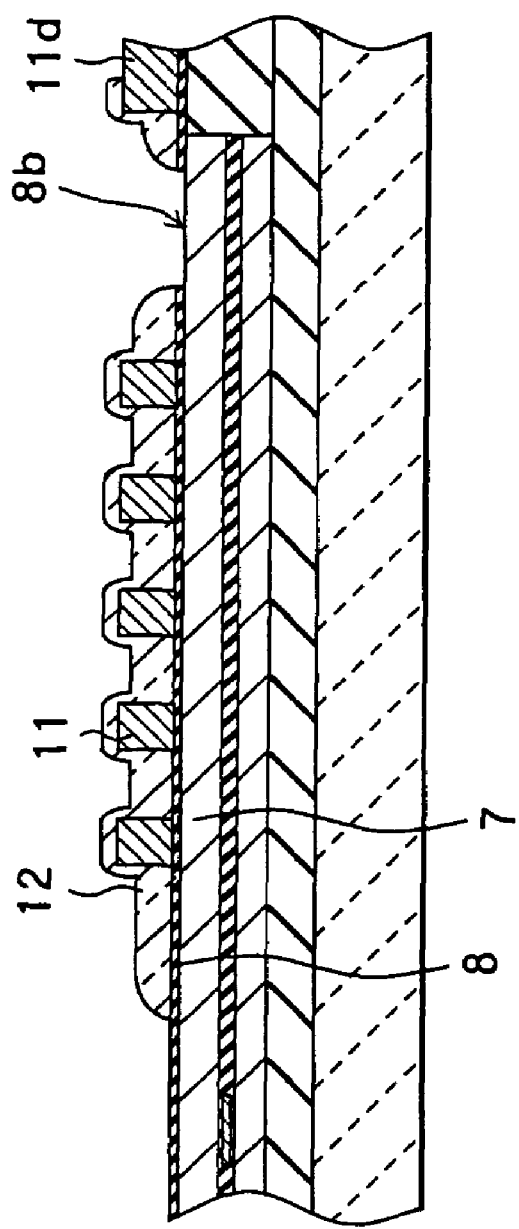
FIGS. 14A and 14B show cross sections for describing a step in a method of manufacturing a thin film magnetic head according to a second embodiment of the invention.

First, with reference to FIGS. 14A and 14B to FIGS. 16A and 16B, a method of manufacturing a composite thin film magnetic head will be described as a method of manufacturing a thin film magnetic head according to a second embodiment of the invention. A thin film magnetic head of the embodiment will together be described in the followings since it is embodied in the method of manufacturing the thin film magnetic head of the embodiment. In FIGS. 14A and 14B to FIGS. 16A and 16B, FIGS. 14A, 15A and 16A show cross sections vertical to the air bearing surface and FIGS. 14B, 15B and 16B show cross sections parallel to the air bearing surface of the magnetic pole. In the figures, identical reference numerals are adopted to the same elements as those of the first embodiment.

In the method of manufacturing the thin film magnetic head of the embodiment, a top pole is formed by separately forming a top pole tip 25a and a top yoke 25c in different steps, which is different from the first embodiment in which the top pole 15 is formed by using the same material in one step.

In the method of manufacturing the thin film magnetic head according to the embodiment, the steps until forming the first insulating film 12 is identical to the case of the first embodiment. That is, as shown in FIGS. 14A and 14B, after the write gap layer 8 having an opening 8b is formed on the top pole 7, the thin film coil 11 and the first insulating film 12 which covers the thin film coil 11 are formed before the top pole tip 25a (FIGS. 15A and 15B) making a part of the top pole 25 which is to be described later is formed on the write gap layer 8. The detailed description of the procedure will be omitted.

Next, as shown in FIGS. 15A and 15B, the top pole tip 25a about 3 to 5 µm thick which is to make a part of the top pole is selectively formed by electro-plating, for example, in the region from the front slope (left-hand side slope in the figure) of the first insulating film 12 to the side (left-hand side in the figure) which is to be the air bearing surface 20 in the later step. The top pole tip 25a has a plane shape shown in FIG. 17 and FIG. 19B, for example, which are to be described later. The characteristic of the shape will be described later. When forming the top pole tip 25a, a pattern 25b for forming the magnetic path is formed in the opening 8b at the same time. For example, a material having high saturation magnetic flux density such as permalloy (NiFe) alloy or iron nitride (FeN) alloy is used for forming the top pole tip 25a and the pattern 25b for forming the magnetic path.

The top pole tip 25a is formed in the same manner as the case where the top pole 15 is formed in the above-mentioned first embodiment. That is, a photoresist pattern for forming the top pole tip 25a is formed by performing a plurality of exposure steps on the same photoresist film using a plurality of photomasks having an opening with different shape. The detail will be described later.

Next, as shown in FIG. 15B, a trim structure is formed through etching the write gap layer 8 and the bottom pole 7 by about 0.5 µm in a self-aligned manner by dry etching by RIE using chlorine gas ($Cl_2$, $CF_4$, $BCl_2$, $SF_6$ or the like), for example, with the top pole tip 25a being a mask.

Next, as shown in FIGS. 16A and 16B, the surfaces of the top pole tip 25a and the pattern 25b for forming the magnetic path are exposed by forming an insulating film 26 about 3 to 4 μm thick made of alumina film, for example, all over and then flattening the whole surface through polishing by CMP (Chemical Machanical Polishing) method, for example. Then, the insulating film 26 covering the coil connection 11d is partially removed by etching or the like to form an opening 26d. The insulating film 26 corresponds to a specific example of "another insulating film" of the invention, and the first insulating film 12 and the insulating film 26 mainly correspond to a specific example of an "insulating layer" of the invention.

Figure 17:
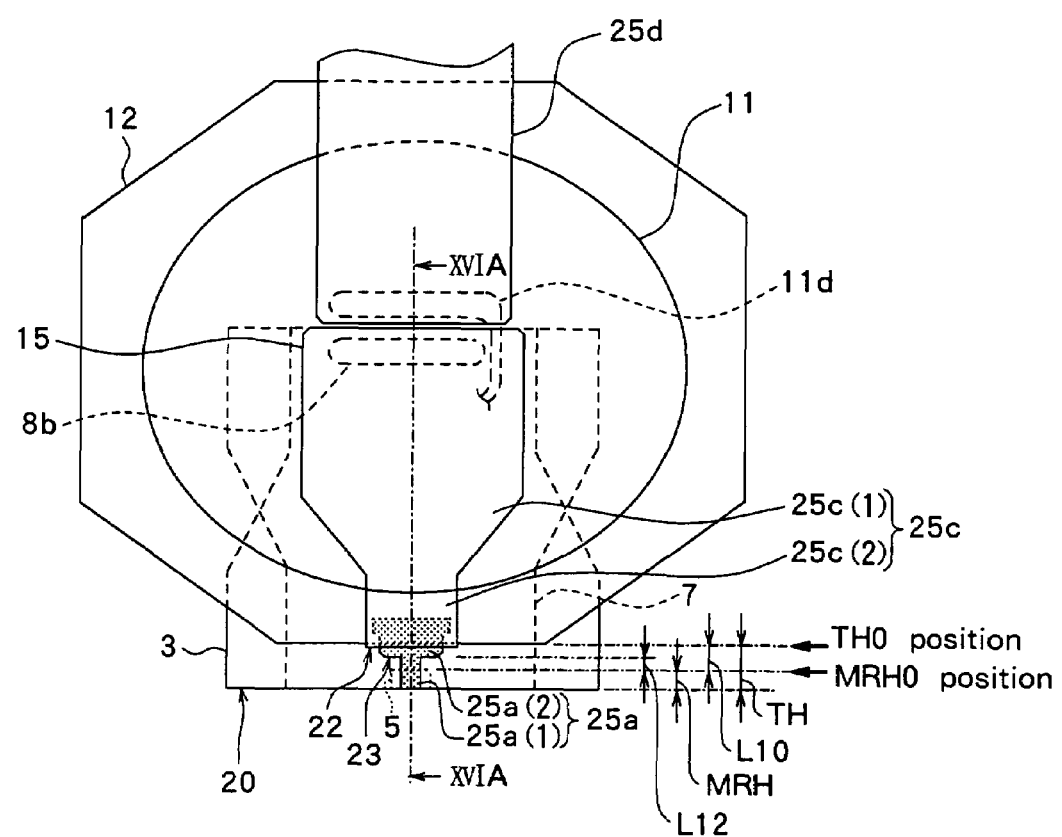
FIG. 17 shows a plan view showing the plan structure of a thin film magnetic head according to the second embodiment of the invention.

Next, a top yoke 25c about 3 to 5 μm thick is formed by electro-plating through the same step as the case where the top pole tip 25a and the pattern 25b for forming the magnetic path are formed. The top yoke 25c has a plan shape as shown in FIG. 17, for example, which is to be described later. The top yoke 25c is magnetically coupled to the bottom pole 7 in the opening 8b through the pattern 25b for forming the magnetic path, and the front end portion of which is magnetically coupled to the top pole tip 25c. The top yoke 25c is made of the same material as the one used for the top pole tip 25c and the pattern 25b for forming the magnetic path, for example. When forming the top yoke 25c, a coil connecting wiring 25d (ref. FIG. 17) which electrically connects the coil connection 11d of the opening 26d and the external circuit (not shown in figure) is formed at the same time by using the same material as the top yoke 25c. The above-mentioned top yoke 25c corresponds to a specific example of the "third magnetic layer" of the invention.

Next, an overcoat layer 27 made of alumina, for example, is formed so as to cover the whole surface. At last, the air bearing surface 20 of the recording head and the reproducing head is formed by performing machine processing on the slider. Thereby, the thin film magnetic head is completed.

FIG. 17 shows a schematic diagram of a plan structure of the thin film magnetic head manufactured through the method of manufacturing the thin film magnetic head of the embodiment. In FIG. 17, the overcoat layer 27 and the like are omitted. As shown in the figure, the TH0 position and the MRH0 position are identical to those of the first embodiment. The length L10 from the MRH0 position to the TH0 position is also the same. The above-mentioned FIG. 16A corresponds to a cross-sectional view taken along the line XVIA—XVIA in FIG. 17.

As shown in FIG. 17, the top yoke 25c comprises a yoke 25c(1) which makes most of the portion, and a connection 25c(2) which is partially overlapped and connected with/to the top pole tip 25a. The yoke 25c(1) has almost the same plan shape and function as those of the yoke 15c of the top pole 15 of the above-mentioned first embodiment. The connection 25c(2) has almost the same plan shape and function as those of the intermediate portion 15b of the top pole 15 of the above-mentioned first embodiment. The centers of the yoke 25c(1) and the connection 25c(2) in each width direction mutually coincide.

Figures 19A, 19B:
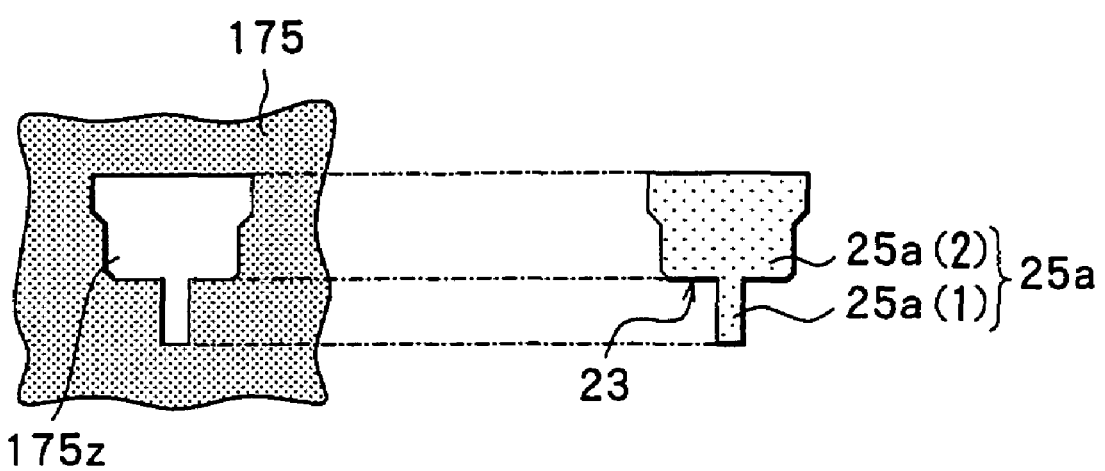
FIGS. 19A and 19B are plan views showing a step following FIGS. 18A to 18D.

As shown in FIG. 17 and FIG. 19B, the top pole tip 25a comprises a tip 25a(1) which determines the write track width on a recording medium and an intermediate portion 25a(2). The intermediate portion 25a(2) has the front portion with a narrower width and the rear portion with a wider width. The front portion of the intermediate portion 25a(2) with a narrower width is coupled to the tip 25a(1) as one body, and the rear portion with a wider width is partially overlapped and magnetically coupled with/to the connection 25c(2) of the top yoke 25c. The position of the front-side end edge surface 22 in the connection of the top yoke 25c is in the TH0 position or the neighboring area. The tip 25a(1) has a constant width for determining the write track width on a recording medium as the tip 15a of the top pole 15 of the above-mentioned first embodiment. There is a step in a width direction in the connection of the tip 25a(1) and the intermediate portion 25a(2). The width of the intermediate portion 25a(2) in the step is greater than that of the tip 25a(1). The shapes of other portions in the above-mentioned step is identical to those in the above-mentioned first embodiment.

As shown in FIGS. 16A and 16B and FIG. 17, a step surface 23 in the intermediate portion 25a(2) of the top pole tip 25a is located in front of the TH0 position and rear of the MRH0 position as in the case of the above-mentioned first embodiment. That is, the intermediate portion 25a(2) with a wider width than the tip 25a(1) with a minute width is provided in front of the TH0 position in order to maintain magnetic volume in the throat height TH. As a result, the throat height TH can be lengthened and the tip 25a(1) can be shortened at the same time. The above-mentioned tip 25a(1) corresponds to a specific example of the "first magnetic layer portion" of the invention and the intermediate portion 25a(2) corresponds to a specific example of the "second magnetic layer" of the invention.

As can be seen from FIGS. 16A and 16B and FIG. 17, the tip 25a(1) of the top pole tip 25a is extended onto the flat write gap layer 8 and the intermediate portion 25a(2) is extended from the write gap layer 8 to the slope of the first insulating film 12.

In the thin film magnetic head of the embodiment, the top pole is formed to be composed of two parts, the top pole tip 25a and the top yoke 25c. The top pole tip 25a and the top yoke 25c are partially overlapped so that sufficient magnetic volume can be maintained in the overlapped region.

Also, the intermediate portion 25a(2) with a wider width than that of the tip 25a(1) is provided between the rear end portion of the tip 25a(1) of the top pole tip 25a and the TH0 position. Therefore, sufficient magnetic volume can be maintained in the rear portion of the tip 25a(1) as in the above-mentioned first embodiment. Thereby, saturation of the magnetic flux flown from the top yoke 25c to the top pole tip 25a in the tip 25a(1) with a minute width can be suppressed and the sufficient magnetic flux can reach the air bearing surface 20. As a result, an excellent overwrite performance can be maintained.

Also, in the embodiment, first, the top pole tip 25a and the pattern 25b are formed after the thin film coil 11 and the first insulating film 12 are formed, and the region on the first insulating film 12 except the top pole tip 25a and the pattern 25b is buried by the insulating layer 26 made of an inorganic material. Then, the whole surface is flattened by CMP method. Therefore, when another layer (in the embodiment, the top yoke 25c) is provided on the flattened surface, fabrication of the photoresist pattern by photolithography can be performed with high precision. As a result, it becomes easy to precisely form the above-mentioned another layer.

Other effects of the embodiment is identical to those of the above-mentioned first embodiment. The effects are that the write track width on a recording medium can be improved and sidewrite during recording of information can be avoided.

[Method of Manufacturing the Top Pole Tip 25a]

Now, a method of manufacturing the top pole tip 25a, which is one of the distinctive characteristics of the embodiment will be described in detail with reference to FIGS. 18A to 18D and FIGS. 19A and 19B.

In the method of manufacturing the thin film magnetic head of the embodiment, as described, a photoresist pattern used for forming the top pole tip 25a is formed by performing a plurality of exposures on the same photoresist film using a plurality of photomasks. By using the photoresist pattern formed in such a manner, the corner of the side edge surface of the tip 25a(1) of the top pole tip 25a and the step surface 23 has a right angle and the width of the tip 25a(1) can be made precisely constant. In the followings, the description will be proceeded in this respect.

FIGS. 18A to 18D respectively correspond to FIGS. 7A to 7D of the above-mentioned first embodiment. FIGS. 19A and 19B respectively correspond to FIGS. 8A and 8B.

Figures 18A, 18B:
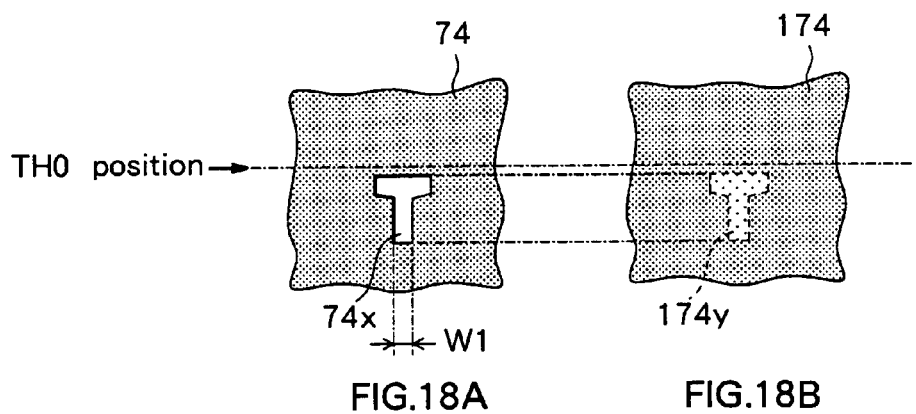
FIGS. 18A to 18D show plan views for describing the manufacturing step of the top pole in a method of manufacturing a thin film magnetic head according to the second embodiment of the invention.

In the embodiment, as in the case of the modification example (FIG. 9A) of the above-mentioned first embodiment, a photomask having an opening 74x with a T-shaped plan shape shown in FIG. 18A is used as a first photomask 74. The opening 74x includes a portion with a constant width and a rear portion with a wider width. By performing a first exposure step using the photomask 74, as shown in FIG. 18B, a first exposed region 174y with a T-shaped plan shape is formed in a photoresist film 174.

Figures 18C, 18D:
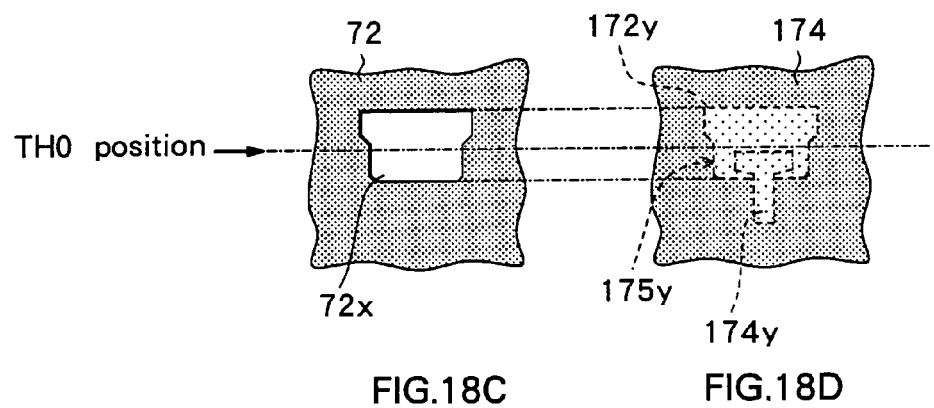

A second exposure step is, as shown in FIG. 18C, performed using a photomask 72 having an opening 72x with a plan shape which corresponds to the intermediate portion 25a(2). Thereby, as shown in FIG. 18D, a second exposed region 172y is formed in the photoresist film 174 so as to partially overlap the rear portion of the first exposed region 174y. After all, a compound exposed region 175y with a portion being double-exposed, which includes the first exposed region 174y and the second exposed region 172y, is formed in the photoresist film 174. The plane shape of the compound exposed region 175y corresponds to the plane shape of the top pole tip 25a (FIG. 17).

A photoresist pattern 175 having an opening 175z is formed by, as shown in FIG. 19A, collectively developing the exposed region 175y of the photoresist film 174.

The top pole tip 25a is formed by performing plating using the photoresist pattern 175 formed in such a manner. The portion from the step surface 23 of the top pole tip 25a formed as described to the air bearing surface has the same distinctive shapes as those of the corresponding portion of the above-mentioned first embodiment and the modification example. Specifically, as shown in FIG. 19B, the connection of the tip 25a(1) and the intermediate portion 25a(2) has the right-angled corner and the tip 25a(1) which is extended from the connection to the air bearing surface has a precisely constant width at any point in a longitudinal direction.

As described, in the method of manufacturing the thin film magnetic head of the embodiment, first, the top pole tip 25a and the pattern 25b are formed after the thin film coil 11 and the first insulating film 12 are formed, and the region on the first insulating film 12 except the top pole tip 25a and the pattern 25b is buried by the insulating layer 26 made of an inorganic material. Then, the whole surface is flattened by CMP method. Therefore, when another layer (in the embodiment, the top yoke 25c) is provided on the flattened surface, fabrication of the photoresist pattern by photolithography can be performed with high precision. As a result, it becomes easy to precisely form the above-mentioned another layer. Especially, in a case where two layers of thin film coils are formed in a layered structure, microfabrication of the second layer of the thin film coil can be simplified. Other effects (effects of making the first exposed region T-shaped, for example) is identical to that of the modification example (FIGS. 9A to 9D, FIGS. 10A and 10B and FIGS. 13A and 13B) of the above-mentioned first embodiment.

[Modification Example of the Method of Manufacturing the Thin Film Magnetic Head]

In the method of manufacturing the thin film magnetic head of the embodiment, as shown in FIGS. 16A and 16B, after the surface of the top pole tip 25a and the pattern 25b is exposed through flattening the whole surface by polishing using CMP method, an opening 26d is formed by partially removing the insulating film 26 covering the coil connection 11d by etching or the like. The coil connection 11d and the coil connecting wiring 25d are connected through the opening 26d. However, the following steps may be taken instead of the above.

Figures 20A, 20B:
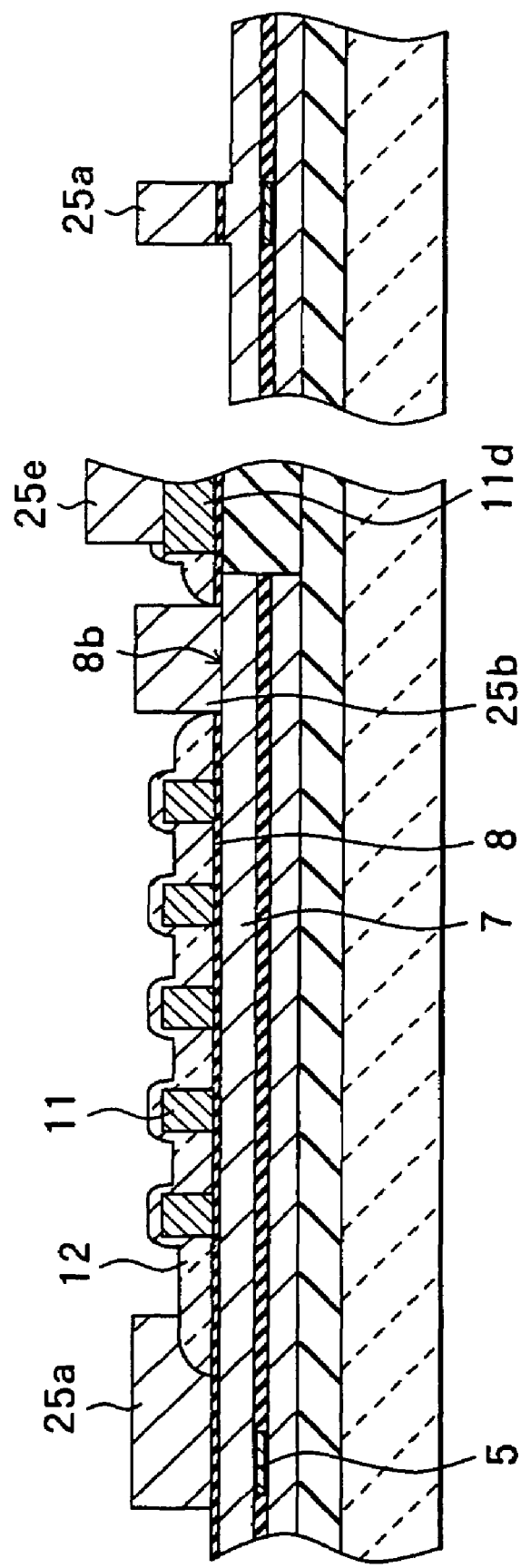
FIGS. 20A and 20B show cross sections for describing a method of manufacturing a thin film magnetic head according to a modification example of the first embodiment of the invention.
Figures 21A, 21B:
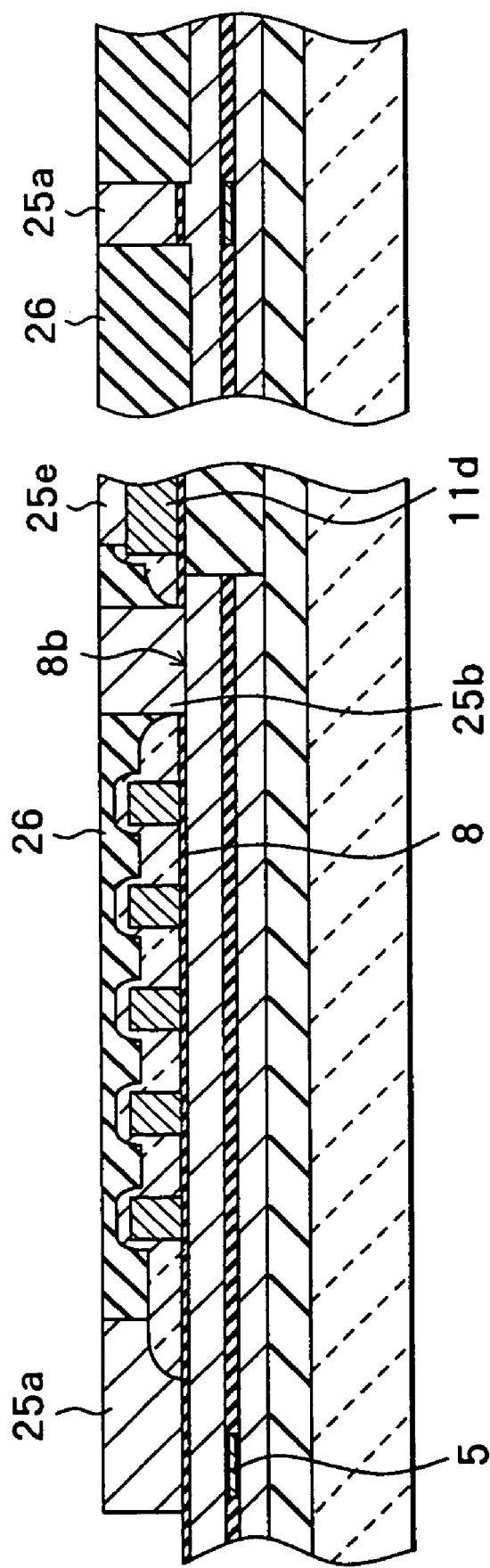
FIGS. 21A and 21B are cross sections showing a step following FIGS. 20A and 20B.
Figures 22A, 22B:
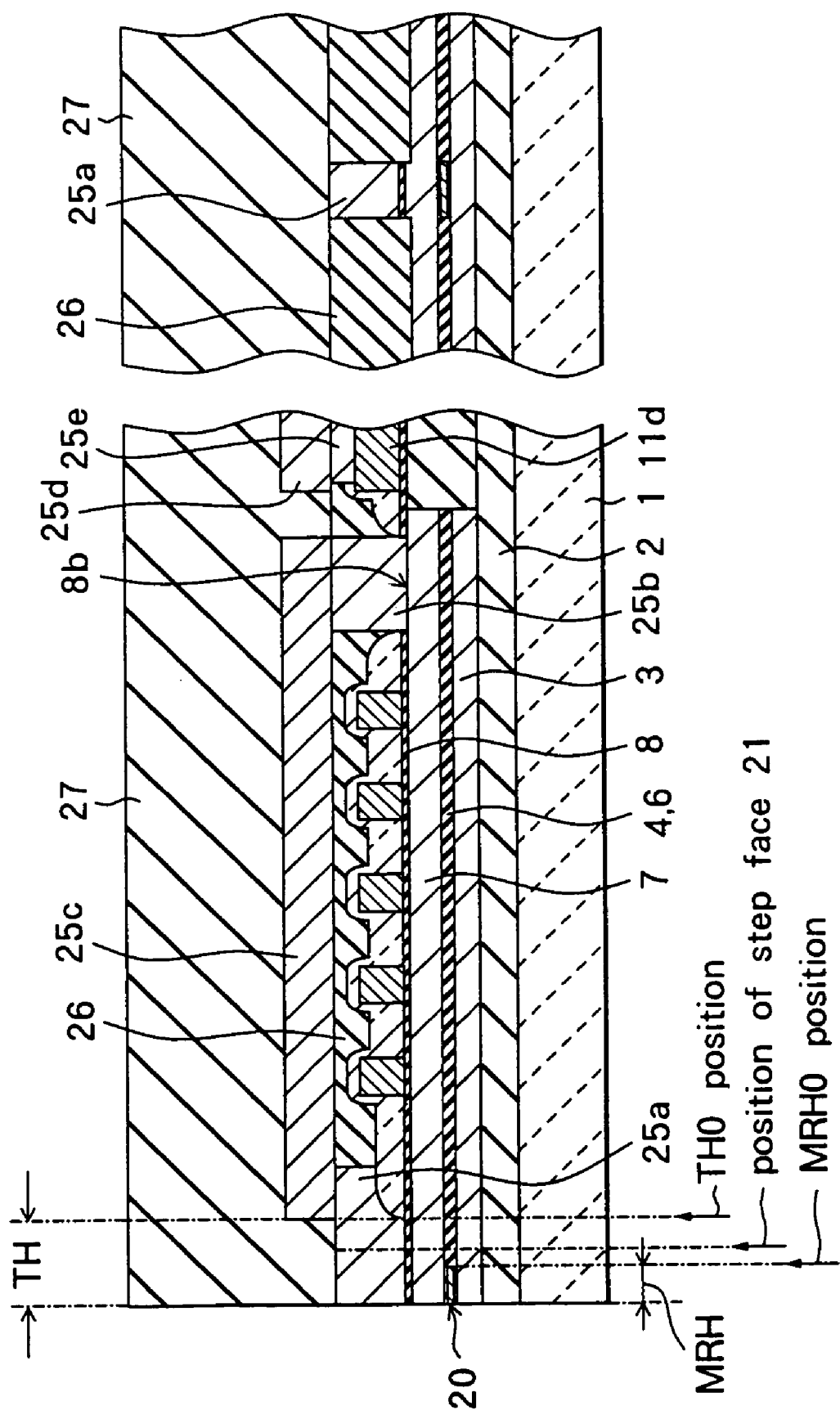
FIGS. 22A and 22B are cross sections showing a step following FIGS. 21A and 21B.

In the modification example, as shown in FIGS. 20A and 20B, in the manufacturing process of the top pole tip 25a and the pattern 25b, another coil connection 25e made of the same material as of the top pole 25a is formed on the coil connection 11d at the same time. Then, as shown in FIGS. 21A and 21B, after the whole surface is covered by the insulating film 26, the whole surface is flattened by CMP method. Thereby, the upper surface of the coil connection 25e is also exposed in addition to the upper surfaces of the top pole tip 25a and the pattern 25b. Next, as shown in FIGS. 22A and 22B, the top yoke 25c and the coil connecting wiring 25d are formed. Thereby, the coil connecting wiring 25d is electrically connected to the thin film coil 11 through the coil connection 25e and the coil connection 11d.

As described, in the modification example, when forming the top pole tip 25a and the pattern 25b, another coil connection 25e is formed on the coil connection 11d at the same time. Therefore, it is unnecessary to form the opening 26d in the insulating film 26 formed to cover the coil connection. 11d unlike the above-mentioned second embodiment (FIGS. 16A and 16B). As a result, the manufacturing process can be simplified.

Third Embodiment

A third embodiment of the invention will be described.

First, with reference to FIGS. 23A and 23B to FIGS. 28A and 28B, a method of manufacturing a composite thin film magnetic head will be described as a method of manufacturing a thin film magnetic head according to the third embodiment of the invention. A thin film magnetic head of the embodiment will together be described in the followings since it is embodied in the method of manufacturing the thin film magnetic head of the embodiment. In FIGS. 23A and 23B to FIGS. 26A and 26B, FIGS. 23A, 24A, 25A and 26A show cross sections vertical to the air bearing surface and FIGS. 23B, 24B, 25B and 26B show cross sections parallel to the air bearing surface of the magnetic pole. In the figures, identical reference numerals are adopted to the same elements as those of the above-mentioned each embodiment.

In the embodiment, the process until the bottom pole 7 shown in FIGS. 23A and 23B is formed is identical to the process shown in FIGS. 1A and 1B of the above-mentioned first embodiment so that the description will be omitted.

In the embodiment, as shown in FIGS. 23A and 23B, after the bottom pole 7 is formed, a bottom pole tip 31a and a bottom connection 31b about 2.0 to 2.5 μm thick made of permalloy, for example, are formed by plating, for example, on the bottom pole 7 in the front and rear region where a thin film coil 33 is to be formed in a later process. Then, an insulating film 32 about 0.3 to 0.6 μm thick made of an insulating material such as alumina is formed over the whole surface by sputtering or CVD, for example. The bottom pole 7 corresponds to a specific example of the "fourth magnetic layer" of the invention and the bottom pole tip 31a and the bottom connection 31b correspond to the "fifth magnetic layer" of the invention.

As shown in FIGS. 24A and 24B, in the lower region other than the bottom pole tip 31a and the bottom connection 31b, a first layer of the thin film coil 33 about 1.5 to 2.5 µm thick is formed so as to encircle the bottom connection 31b by electroplating, for example. At the same time, in the lower region rear of the bottom connection 31b, a coil connection 33d for connecting with the coil connecting wiring 45d which is to be formed in a later process is formed.

Next, as shown in the figure, after an insulating film 34 about 3 to 4 µm thick made of alumina film, for example, is formed over the whole surface, the whole surface is flattened by polishing using CMP method, for example, so as to expose the surface of the bottom pole tip 31a and the bottom connection 31b. The insulating film 34 corresponds to a specific example of "a part of an insulating layer" of the invention.

As shown in FIGS. 25A and 25B, a write gap layer 35 about 0.15 to 0.3 µm thick made of alumina, for example, is formed over the whole surface. At this time, the write gap layer 35 is patterned so that an opening 35b is formed on the upper surface of the bottom connection 31b.

Next, as shown in the figure, an insulating film pattern 36 about 0.8 to 1.2 µm thick, for example, for determining the apex angle and the throat height TH is formed on the flat write gap layer 35 at the front region of the opening 35b. For example, photoresist which exhibits liquidity by applying heat is used as the insulating film pattern 36. Then, the surface of the insulating film pattern 36 is flattened by performing heat treatment at 200° C., for example. By the heat treatment, the outer edge of the insulating film pattern 36 becomes a moderately rounded slope. The insulating film pattern 36 is formed so that the front edge is located in front of the rear edge of the bottom pole tip 31a and rear of the rear edge of the MR film 5. Mainly, the above-mentioned insulating film 34 and the insulating film pattern 36 correspond to a specific example of the "insulating layer" of the invention.

Figures 28A, 28B:
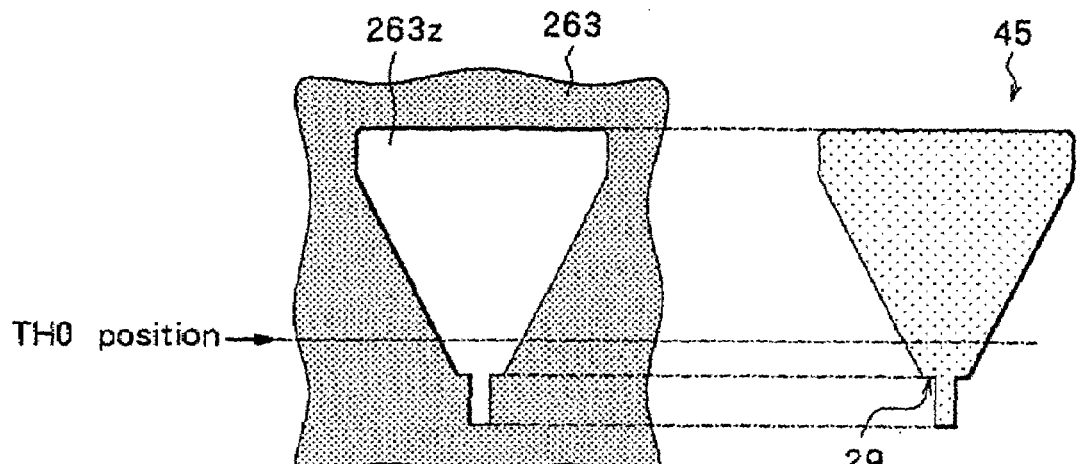
FIGS. 28A and 28B show plan views for describing a step following FIGS. 27A to 27D.

Next, as shown in FIGS. 26A and 26B, a top pole 45 with a plan shape, as shown in FIG. 28B, for example, is selectively formed in the region from the flat write gap layer 35 on the bottom pole tip 31a over the insulating film pattern 36 to the opening 35b of the bottom connection 31b. At the same time, a coil connecting wiring 45d for electrically connecting the upper surface of the coil connection 33d exposed by the opening 34d and the external circuit (not shown in figure) is selectively formed. In the forming process of the top pole 45, as will be described later, first, a photoresist pattern is formed through two exposure steps using different kinds of photomasks, and a single development step. Then, the top pole 45 is formed by electroplating using the photoresist pattern. At last, the whole surface is covered by an overcoat layer 46. The process hereafter is identical to that of the above-mentioned each embodiment so that the description will be omitted.

[Manufacturing Method of a Top Pole]

A method of manufacturing the top pole 45 will be described with reference to FIGS. 27A to 27D and FIGS. 28A and 28B. FIGS. 27A to 27D respectively correspond to FIGS. 7A to 7D of the above-mentioned first embodiment and FIGS. 28A and 28B respectively correspond to FIGS. 8A and 8B. In the figures, identical reference numerals are adopted to the composing elements identical to those of FIGS. 7A to 7D and FIGS. 8A and 8B, and the description will be omitted where appropriate.

In the embodiment, as in the case of the first embodiment (FIG. 7A), as shown in FIG. 27A, a photomask having a opening 61x with a constant width along the longitudinal direction is used as a first photomask 61. By performing the first exposure step using the photomask 61, as shown in FIG. 27B, the first exposed region 161y having a plane stick shape is formed in the photoresist film 161.

The second exposure step is, as shown in FIG. 27C, performed by using a photomask 262 having an opening 262x with a plan shape which corresponds to the yoke of the top pole 45. Thereby, as shown in FIG. 27D, the second exposed region 262y is formed in the photoresist film 161 so as to partially overlap the rear portion of the first exposed region 161y. After all, a compound exposed region 263y with a portion being double-exposed, which includes the first exposed region 161y and the second exposed region 262y, is formed in the photoresist film 161. The plane shape of the compound exposed region 263y corresponds to the plane shape of the top pole 45 (FIG. 28B).

Then, as shown in FIG. 28A, a photoresist pattern 263 having an opening 263z is formed by collectively developing the compound exposed region 263y of the photoresist film 161.

By performing plating using the photoresist pattern 263 manufactured as described, the top pole 45 with plane shape as shown in FIG. 28B is formed. The portion from the step surface 29 of the top pole 45 manufactured in this manner to the air bearing surface has the same shape characteristic as the corresponding portion of the above-mentioned first embodiment and the modification example. The description will be omitted.

As described, in the method of manufacturing the thin film magnetic head of the embodiment, a thin film coil 33 is buried in the region other than the bottom pole tip 31a and the bottom connection 31b under the flat write gap layer 35 with the insulating layer 34 and another layer (in the embodiment, the insulating film pattern 36) is provided on the flat surface of the write gap layer 35. Therefore, fabrication of photoresist pattern by photolithography can be performed with high precision and precise fabrication of the above-mentioned another layer is simplified. Especially, in a case where two layers of thin film coils are formed in the layered structure, microfabrication of the second layer of the thin film coils can be simplified. Other effects are identical to those of the above-mentioned first embodiment (FIGS. 7A to 7D and FIGS. 8A and 8B).

The invention has been described by referring to a number of embodiments. However, the invention is not limited to the embodiments but also various modification is applicable. For example, in the above-mentioned each embodiment and the modification example, the plane shapes of the top pole 15, the top yoke 25c, the top pole tip 25a and the like are not limited to the ones shown in FIG. 5 and FIG. 17. The shapes of the above-mentioned portions can be freely modified or combined as long as the portions have shapes which allow the magnetic flux generated in the thin film coil 11 to reach the tip portion such as the tip 15a, 25a(1).

Figure 29:
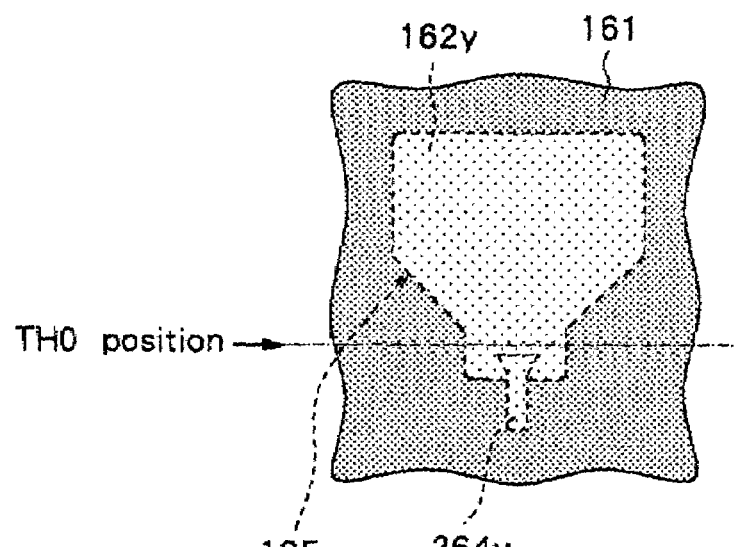
FIG. 29 shows a plan view for describing a modification example of the third embodiment of the invention.
Figure 30:
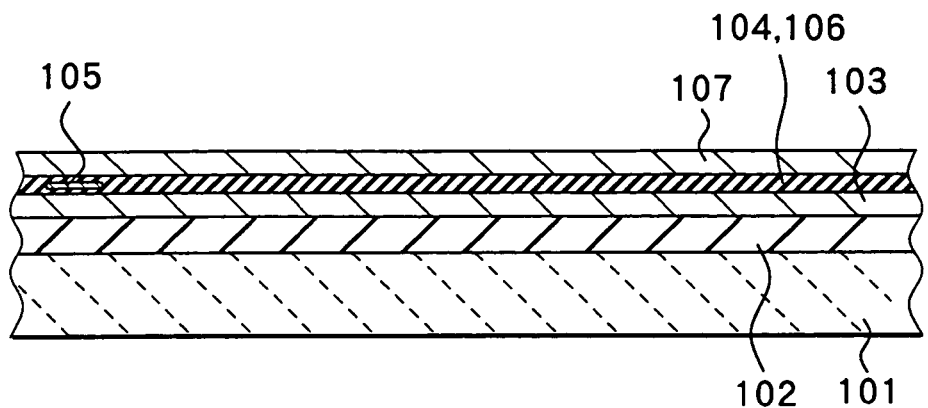
FIG. 30 shows a cross section for describing a step in a method of manufacturing a thin film magnetic head of the related art.
Figure 31:
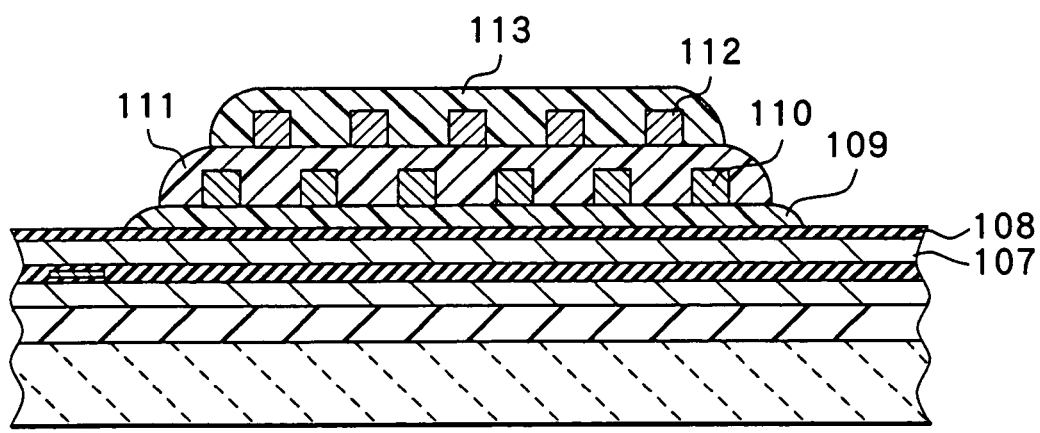
FIG. 31 shows a cross section following FIG. 30.
Figure 32:
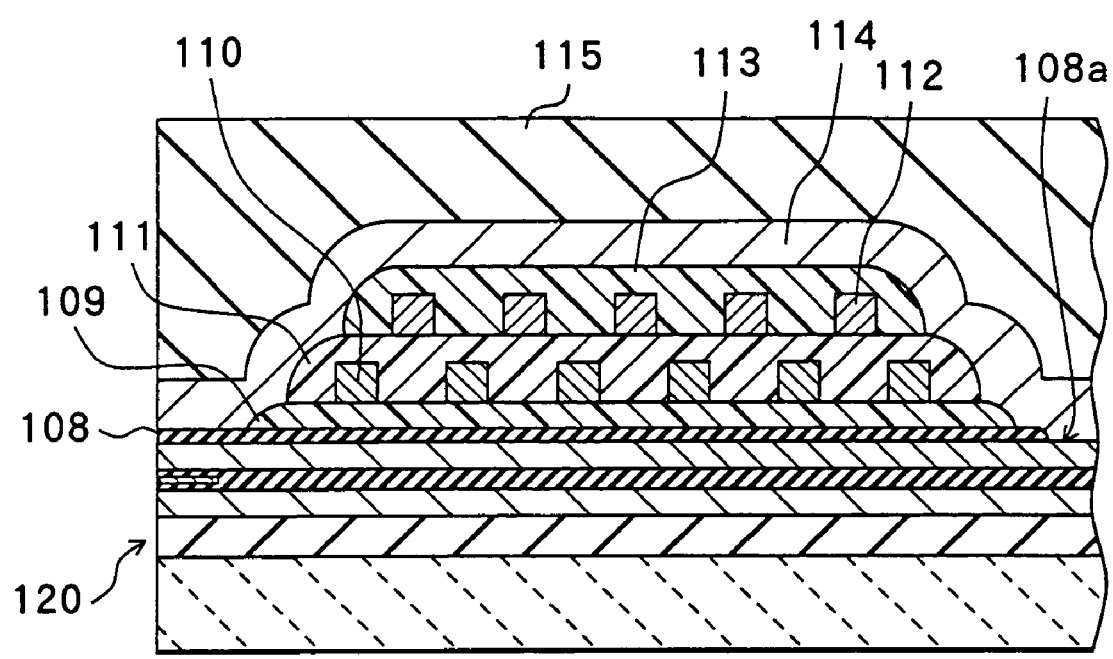
FIG. 32 shows a cross section for describing a step following FIG. 31.
Figure 33:
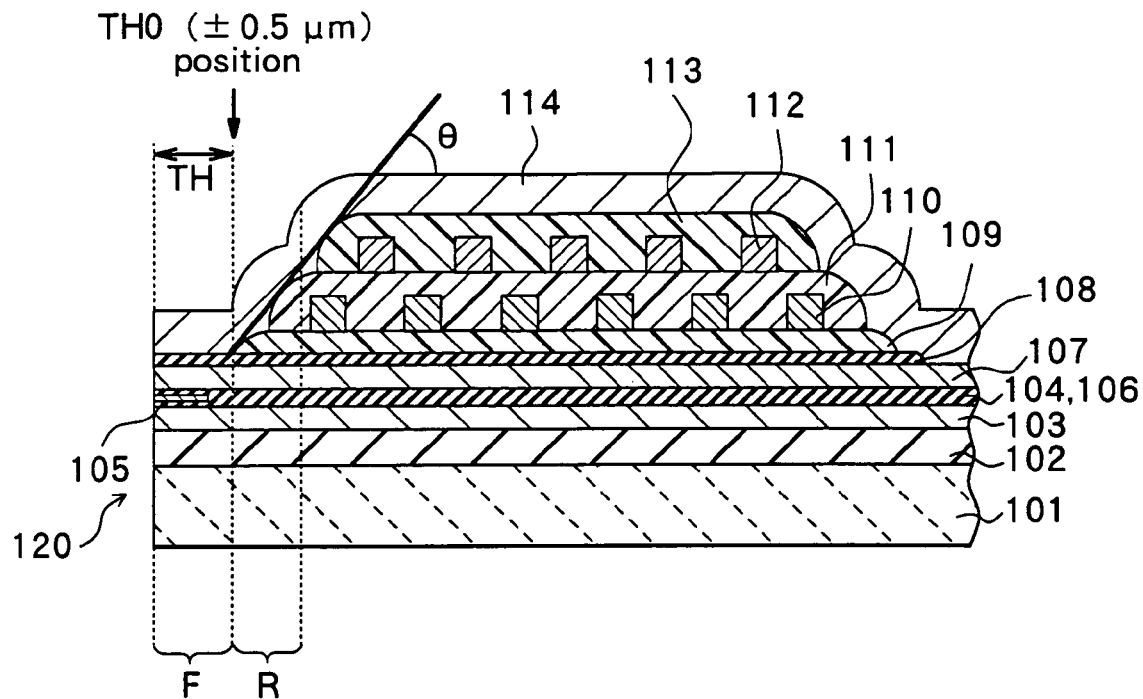
FIG. 33 is a cross section showing the main structure of a thin film magnetic head of the related art.
Figure 34:
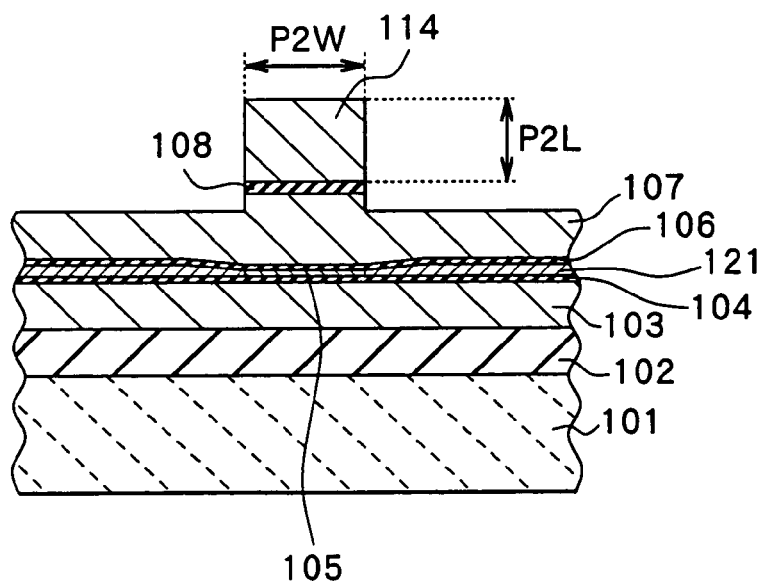
FIG. 34 shows a cross section parallel to the air bearing surface of the thin film magnetic head shown in FIG. 33.

Also, the plan shape of the exposed region of the first exposure step at the time of forming the top pole is not limited to the ones shown in FIG. 7D and FIG. 9D but may take another shape. For example, as shown in FIG. 29, the exposed region of the first exposure step may be the region 264y having a constant width portion which determines the write track width and a portion having a width which becomes wider to the direction rear of the constant width portion. FIG. 29 corresponds to FIG. 9D and shows the compound exposed region 165y of another modification example of the first embodiment using the integrated top pole 15. In this case, same effects as the case shown in FIGS. 9A to 9D can also be attained. Also in a case where the top pole is separated into a top pole tip and a top yoke, the region 264y with a shape shown in FIG. 29 may be adopted instead of the first exposed region 174y shown in FIG. 18D.

Also, in each of the above-mentioned embodiment, as described in FIGS. 7A to 7D, for example, the region 161x corresponding to the tip 15a of the top pole is exposed in the first exposure step and the region 162y corresponding to the intermediate portion 15b and the yoke 15c is exposed in the second exposure step. Inversely, the region 162y corresponding to the intermediate portion 15b and the yoke 15c may be exposed in the first exposure step and the region 161x corresponding to the tip 15a of the top pole 15 may be exposed in the second exposure step.

Furthermore, in the embodiments, NiFe, iron nitride (FeN) or the like is used for the top pole 15, the top yoke 25c, the top pole tip 25a and the like. In addition, a mterial having high saturation magnetic flux density such as amorphous of Fe—Co—Zr may be used or a material in which two or more kinds of the materials are stacked may be used. Also, a magnetic material in which NiFe and the above-mentioned material having high saturation magnetic flux density are stacked may be used for the bottom pole 7.

Moreover, for example, in the above-mentioned each embodiment and the modification example, a method of manufacturing a composite thin film magnetic head is described. However, the invention can be applied to a thin film magnetic head for recording only with an inductive magnetic transducer for writing or a thin film magnetic head with an inductive magnetic transducer for both of recording and reproducing. Also, the invention can be applied to a thin film magnetic head with a configuration in which the order of stacking an element for writing and an element for reading out is reversed.

As described, in a thin film magnetic head or a method of manufacturing a thin film magnetic head of the invention, one of the two magnetic layers includes: a first magnetic layer portion extending from recording-medium-facing surface in a longitudinal direction to be away from the recording-medium-facing surface, and having a constant width for defining a write track width of a recording medium; and a second magnetic layer portion magnetically coupled to the first magnetic layer portion in the rear edge of the first magnetic layer portion on the side away from the recording-medium-facing surface; wherein a coupling position at which the first and second magnetic layer portions are coupled each other is closer to the recording-medium-facing surface than the front edge of the insulating layer on the side close to the. recording-medium-facing-surface; and at least the portion of the second magnetic layer portion between the front edge of the insulating layer and the rear edge of the first magnetic layer portion has a width wider than that of the first magnetic layer portion. By providing the second magnetic layer with a width wider than that of the first magnetic layer, the magnetic flux, generated by the thin film coil is suppressed to be saturated in the second magnetic layer before reaching the first magnetic layer. As a result, the magnetic flux generated by the thin film coil is gradually concentrated and can effectively reach from the second magnetic layer to the first magnetic layer and to the tip. Also, even if the length from the front end edge of the insulating layer to the recording-medium facing surface, that is, the throat height is lengthened, the length of the first magnetic layer with a constant width which defines the write track width of the recording medium can be properly adjusted. Therefore, saturation of the magnetic flux inside the first magnetic layer can also be avoided. Accordingly, also even if the width of the first magnetic layer is microfabricated to submicron, for example, necessary and sufficient magnetic flux can be supplied to the tip of the first magnetic layer. As a result, an excellent overwrite performance can be attained.

Especially, in a thin film magnetic head or a method of manufacturing a thin film magnetic head in one aspect of the invention, a step face vertical to an extending direction of the first magnetic layer portion is formed at the coupling position of the first magnetic layer portion and the second magnetic layer portion. Therefore, the length of the first magnetic layer with a constant width which defines the write track width of a recording medium can be precisely determined. As a result, stable recording performance can be attained.

Also, in a thin film magnetic head or a method of manufacturing thin film magnetic head in one aspect of the invention, further when the thin magnetic head comprises a magnetic transducer film extending from the recording-medium-facing surface in a longitudinal direction to be away from the recording-medium-facing surface wherein: the coupling position is located between the rear edge of the magnetic transducer film and the front edge of the insulating layer. Therefore, problems such as sidewrite caused by the magnetic flux directly reaching from the second magnetic layer to the recording medium and an influence on the magnetic transducer film by leakage of the magnetic flux from the second magnetic layer, which occur when the above-mentioned coupling position is excessively close to the recording-medium facing surface, can be suppressed.

Also, in a thin film magnetic head or a method of manufacturing a thin film magnetic head in one aspect of the invention, the gap layer has a region with a flat surface; the thin film coil is formed on the flat region of the gap layer; and the insulating layer includes an insulating film which covers the whole of the thin film coil and a part of the gap layer. Therefore, a thin film coil can be formed with high precision when forming the thin film coil by photolithography, for example. Also, the spaces between the turns of the thin film coil can be filled with the insulating film without a void since the film coil is covered by the insulating film.

Furthermore, in a thin film magnetic head or a method of manufacturing a thin film magnetic head in one aspect of the invention, the first magnetic layer portion is located on a part of the region with a flat surface of the gap layer, the part of the region being not covered with the insulating film. Therefore, for example, when photolithography is used, influence of the reflecting light from the underlayer can be decreased so that the first magnetic layer can be formed with high precision.

In a thin film magnetic head or a method of manufacturing a thin film magnetic head of the invention, the second magnetic layer portion terminates on the slope of the insulating film; and the insulating layer includes another insulating film formed to fill a space over the insulating film up to the same level as a top surface of the second magnetic layer portion. Therefore, the upper surface is planarized after forming another insulating film. As a result, when forming still another layer on the upper surface, the layer can be formed with high precision.

Also, in a method of manufacturing a thin film magnetic head of the invention, the first, second and third magnetic layer portions are integrally formed in one piece through a series of the manufacturing steps. As a result, manufacturing process can be simplified Furthermore, in a method of manufacturing a thin film magnetic head in one aspect of the invention, a step of forming an insulating film on the gap layer with a flat surface, the insulating film having a slope towards the surface of the gap layer and constituting at least a part of the insulating layer; a step of forming a photoresist layer so as to cover the gap layer and the insulating film; a first exposure step of selectively exposing a first region of the photoresist layer including a region corresponding to the first magnetic layer portion, the first region corresponding to a flat region of the gap layer; and a second exposure step of selectively exposing at least a second region of the photoresist layer corresponding to the second magnetic layer portion, the second region corresponding to a region from the slope of the insulating film to the flat region of the gap layer: wherein the first region and the second region partially overlap each other. Therefore, exposure of the first region can be performed without being influenced by the reflecting light from the underlayer (the slope of the insulating film). As a result, the width of the portion corresponding to the first magnetic layer of the photoresist pattern for forming the first magnetic layer can be maintained constant at any points in the longitudinal direction. Accordingly, for example, by using the photoresist pattern, the width in the longitudinal direction can be precisely maintained constant when forming the first magnetic layer. As a result, the write track width of a recording medium can be precisely controlled.

Moreover, in a method of manufacturing a thin film magnetic head of the invention, the first region includes: a constant-width part having a constant width, which extends from the recording-medium-facing surface in a longitudinal direction to be away from the recording-medium-facing surface and defines the write track width of the recording medium; and a wide-width part with a width wider than the constant-width part, at least a part of the wide-width part overlapping the second region. Therefore, problems such as a narrow part being formed at the coupling position between the first magnetic layer and the second magnetic layer caused by the deviation of an exposure area, for example, can be suppressed even if the overlapped region is sufficiently small.

Obviously many modifications and variations of the present invention are possible in the light of the above teachings. It is therefore to be understood that within the cope of the appended claims the invention may be practiced otherwise than as specifically described.

What is claimed is:

1. A method of manufacturing a thin film magnetic head including two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers;

formation of one of the two magnetic layers is performed by the steps of:

forming a first magnetic layer portion extending from recording-medium-facing surface in a longitudinal direction to be away from the recording-medium-facing surface, and having a constant width for defining a write track width of the recording medium; and forming a second magnetic layer portion magnetically coupled to the first magnetic layer portion in the rear edge of the first magnetic layer portion on the side away from the recording-medium-facing surface;

wherein a coupling position at which the first and second magnetic layer portions are coupled to each other is closer to the recording-medium-facing surface than a front edge of the insulating layer, the front edge determining a throat height 0 position, on the side close to the recording-medium-facing surface;

at least a portion of the second magnetic layer portion between the front edge of the insulating layer and the rear edge of the first magnetic layer portion has a width wider than that of the first magnetic layer portion; and further comprising a magnetic transducer film extending from the recording-medium-facing surface in a longitudinal direction to be away from the recording-medium-facing surface wherein:

the coupling position is located between the rear edge of the magnetic transducer film and the front edge of the insulating layer.

2. The method of manufacturing a thin film magnetic head according to claim 1, wherein a step in a width direction is formed at the coupling position of the first magnetic layer portion and the second magnetic layer portion.

3. The method of manufacturing a thin film magnetic head according to claim 2, wherein a step face vertical to an extending direction of the first magnetic layer portion is formed at the coupling position.

4. The method of manufacturing a thin film magnetic head according to claim 1, wherein a length from the recording-medium-facing surface to the front edge of the insulating layer lies within a range of one-and-a-half to six times a length of the magnetic transducer film.

5. The method of manufacturing a thin film magnetic head according to claim 1, wherein the one of the two magnetic layers further includes a third magnetic layer portion which is magnetically coupled to the second magnetic layer portion and extends to cover a part of the thin film coil with the insulating layer in between.

6. The method of manufacturing a thin film magnetic head according to claim 5, wherein the first, second and third magnetic layer portions are integrally formed in one piece through a series of the manufacturing steps.

7. The method of manufacturing a thin film magnetic head according to claim 5, wherein the first and second magnetic layer portions are integrally formed in one piece through a series of the manufacturing steps; and the third magnetic layer portion is formed separately from the first and second magnetic layer portions through a manufacturing step different from the steps of manufacturing the first and second magnetic layer portions.

8. The method of manufacturing a thin film magnetic head according to claim 7, wherein the third magnetic layer is formed so that the third magnetic layer extends overlapping at least a part of the second magnetic layer portion.

9. A method of manufacturing a thin film magnetic head according to claim 1, wherein:

the gap layer has a region with a flat surface;

the thin film coil is formed on the flat region of the gap layer; and the insulating layer includes an insulating film which covers the whole of the thin film coil and a part of the gap layer.

10. The method of manufacturing a thin film magnetic head according to claim 9 wherein a position of the front edge of the insulating layer is defined by an edge of the insulating film on the side closer to the recording-medium-facing surface.

11. The method of manufacturing a thin film magnetic head according to claim 10 wherein the first magnetic layer portion is located on a part of the region with a flat surface of the gap layer, the part of the region being not covered with the insulating film.

12. The method of manufacturing a thin film magnetic head according to claim 11 wherein:

a surface of the insulating film on the side closer to the recording-medium-facing surface forms a slope towards the surface of the gap layer; and the second magnetic layer portion extends from the coupling position onto the slope of the insulating film.

13. The method of manufacturing a thin film magnetic head according to claim 1, wherein the first and second magnetic layer portions are integrally formed in one piece through a series of the manufacturing steps.

* * * * *